US008843079B2

(12) United States Patent
Yoneyama

(10) Patent No.: US 8,843,079 B2
(45) Date of Patent: Sep. 23, 2014

(54) COMMUNICATION APPARATUS AND PROGRAM FOR IDENTIFYING FAULTS AND COMPUTER PROGRAM STORAGE MEDIUM

(75) Inventor: Seijiro Yoneyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 837 days.

(21) Appl. No.: 12/262,718

(22) Filed: Oct. 31, 2008

(65) Prior Publication Data

US 2009/0149133 A1 Jun. 11, 2009

(30) Foreign Application Priority Data

Nov. 2, 2007 (JP) .................. 2007-286076

(51) Int. Cl.
  *H04B 17/00* (2006.01)
  *H04L 1/20* (2006.01)
  *H04L 1/00* (2006.01)
  *H04L 1/18* (2006.01)

(52) U.S. Cl.
  CPC .......... *H04B 17/007* (2013.01); *H04B 17/0042* (2013.01); *H04L 1/18* (2013.01); *H04L 1/20* (2013.01); *H04L 1/0019* (2013.01)
  USPC ...................... 455/67.13; 370/242

(58) Field of Classification Search
  CPC ............. H04B 17/0042; H04B 17/007; H04L 1/0019; H04L 1/18; H04L 1/20
  See application file for complete search history.

(56) References Cited

U.S. PATENT DOCUMENTS

| | | | | |
|---|---|---|---|---|
| 6,459,695 | B1 * | 10/2002 | Schmitt | 370/344 |
| 2004/0047314 | A1 * | 3/2004 | Li | 370/335 |
| 2005/0030924 | A1 * | 2/2005 | Yano et al. | 370/332 |
| 2005/0255873 | A1 * | 11/2005 | Zhang et al. | 455/522 |
| 2008/0144500 | A1 * | 6/2008 | Chen et al. | 370/235 |
| 2008/0146172 | A1 * | 6/2008 | Makhlouf et al. | 455/114.2 |
| 2009/0225682 | A1 * | 9/2009 | Grote-Lopez et al. | 370/255 |

FOREIGN PATENT DOCUMENTS

| | | |
|---|---|---|
| JP | 2002-158667 | 5/2002 |
| JP | 2002-223218 | 8/2002 |
| JP | 2006-005775 | 1/2006 |
| WO | 2005-083953 A1 | 9/2005 |
| WO | 2008-076664 A1 | 6/2008 |

OTHER PUBLICATIONS

Kim et al, A Novel Hidden Station Detection Mechanism in IEEE 802.11 Wylan, IEEE Communications Letters, vol. 10, No. 8, Aug. 2006.
Japanese Office Action for Japanese Application No. 2007-286076 mailed on Apr. 20, 2012.
European Search Report for Application No. 08253564.2-1855/ 2056497 Dated Jan. 22, 2014, 6 pgs.

* cited by examiner

*Primary Examiner* — Zhiyu Lu
(74) *Attorney, Agent, or Firm* — Amin, Turocy & Watson, LLP

(57) ABSTRACT

A communication apparatus that identifies a fault of a radio link between a radio terminal and a radio base station includes according to an aspect of the present invention: a statistical information acquisition unit configured to acquire statistical information indicating a state of the radio link between the radio terminal and the radio base station from at least one of the radio terminal and the radio base station; and a fault identification unit configured to identify a fault of the radio link based on an acquired statistical information from among a plurality of faults associated with a plurality of statistical information beforehand.

15 Claims, 24 Drawing Sheets

| FAULT | FAULT PRODUCED | STATISTICAL ACQUISITION POSITION | STATISTICAL INFORMATION ||||| 
| | | | RSSI VALUE (dBm) | Channel Load (%) | FREQUENCY OF FAILURES TO RECEIVE ACK (TIMES/5 MIN) | RECEPTION FREQUENCY OF DUPLICATE FRAMES (TIMES/5 MIN) | RECEPTION FREQUENCY OF RTS FRAMES (TIMES/5 MIN) |
|---|---|---|---|---|---|---|---|
| HIDDEN TERMINAL (STA) | STA→SP TRANSMISSION DATA CAUSES INTERFERENCE | AP | — | — | — | — | — |
| | | STA | — | — | INCREASED | — | — |
| HIDDEN TERMINAL (AP) | AP→STA TRANSMISSION DATA CAUSES INTERFERENCE | AP | — | — | INCREASED | — | — |
| | | STA | — | — | — | — | — |
| EXPOSED TERMINAL (STA) | STA→AP TRANSMISSION DATA COLLISION AVOIDANCE OCCURS FREQUENTLY AP→STA TRANSMISSION DATA CAUSES INTERFERENCE | AP | — | — | INCREASED | — | — |
| | | STA | — | INCREASED | — | — | INCREASED |
| EXPOSED TERMINAL (AP) | AP→STA TRANSMISSION DATA CAUSES INTERFERENCE STA→AP TRANSMISSION DATA COLLISION AVOIDANCE OCCURS FREQUENTLY | AP | — | INCREASED | — | — | INCREASED |
| | | STA | — | — | INCREASED | — | — |
| MULTIPATH FADING | STA→AP TRANSMISSION DATA CAUSES MULTIPATH FADING | AP | — | — | INCREASED | INCREASED | — |
| | | STA | — | — | INCREASED | INCREASED | — |
| NON-IEEE802.11 INTERFERENCE (MICROWAVE OVEN OR THE LIKE) | STA→AP TRANSMISSION DATA CAUSES INTERFERENCE | AP | — | INCREASED | INCREASED | INCREASED | — |
| | | STA | — | INCREASED | INCREASED | INCREASED | — |
| CONGESTION | STA→AP TRANSMISSION DATA COLLISION AVOIDANCE OCCURS FREQUENTLY | AP | — | INCREASED | — | — | — |
| | | STA | — | INCREASED | — | — | — |
| SHADOWING | STA→AP TRANSMISSION DATA CAUSES SHADOWING | AP | DECREASED | — | INCREASED | INCREASED | — |
| | | STA | DECREASED | — | INCREASED | INCREASED | — |

FIG. 24

COMMUNICATION APPARATUS AND PROGRAM FOR IDENTIFYING FAULTS AND COMPUTER PROGRAM STORAGE MEDIUM

CROSS REFERENCE TO RELATED APPLICATIONS

This application is based upon and claims the benefit of priority from the prior Japanese Patent Applications No. 2007-286076, filed on Nov. 2, 2007; the entire contents of which are incorporated herein by reference.

BACKGROUND OF THE INVENTION

1. Field of the Invention

The present invention relates to a communication apparatus capable of communicating with a radio terminal and radio base station and a method for identifying faults in a radio link between the radio terminal and radio base station and a computer program storage medium.

2. Related Art

Radio systems compliant with the IEEE802.11 standard have a problem that radio link errors such as radio interference occur and communication performance of radio terminals deteriorate. Therefore, in improving reliability of a radio system, when a radio link error occurs, how to speedily detect the fault which causes it, take remedial actions and shorten a time during which the communication performance deteriorates (MTTR: Mean Time To Repair) is an important issue.

Examples of the method of detecting a radio link error include a method of taking and observing statistics of the frequency of CRC errors in frames on a radio terminal or base station and thereby detecting radio interference. This is a method using a correlation between the occurrence of interference between frames on a radio link and detection of CRC errors on the radio terminal or base station, and is a method whereby when an increase is observed with respect to the frequencies at which CRC errors is detected, the occurrence of interference is estimated.

However, a CRC error is not always a phenomenon caused by only radio interference, but a phenomenon caused when, for example, communication data of a third party who has nothing to do with the other party of communication is received at a low reception level, too. Therefore, a CRC error may occur even when no radio interference occurs or when no communication is being carried out, hence there is a problem that radio interference is detected wrongly.

On the other hand, administrators need not only detect a radio link error but also identify the faults. For example, radio interference is produced by various faults such as the collision by a hidden terminal, the multipath fading caused by reflected waves due to walls or the like and non-IEEE802.11 standard interference wave such as a microwave oven and Bluetooth™. That is, even if radio interference can be detected using CRC errors, if the faults cannot be more specifically identified, the administrators cannot take specific remedial actions against the faults such as prevention of a hidden terminal or reflected wave and elimination of interference sources.

Sunggeun Jin, Sunghyun Choi, Youngsoo Kim, and Kyunghun Jang, "A Novel Idle Mode Operation in IEEE 802.11 WLANs," IEEE 802.11-05/1263r3, January 2006 describes a method of detecting a hidden terminal. This document shows an approach of detecting a hidden terminal by observing an ACK frame from which no DATA frame can be observed, but this approach provides no measures for avoiding erroneous detection when, for example, a DATA frame is lost due to interference.

As shown above, methods of identifying the fault using statistical information have been conventionally studied, but there is a limit to the number of types of the faults that can be identified using such methods and the degree of accuracy of identification is low.

SUMMARY OF THE INVENTION

According to an aspect of the present invention, there is provided with a communication apparatus that identifies a fault of a radio link between a radio terminal and a radio base station, comprising:

a statistical information acquisition unit configured to acquire statistical information indicating a state of the radio link between the radio terminal and the radio base station from at least one of the radio terminal and the radio base station; and a fault identification unit configured to identify a fault of the radio link based on an acquired statistical information from among a plurality of faults associated with a plurality of statistical information beforehand.

According to an aspect of the present invention, there is provided with a method for identifying a fault of a radio link between a radio terminal and a radio base station, comprising:

acquiring statistical information indicating a state of the radio link between the radio terminal and the radio base station from at least one of the radio terminal and the radio base station; and identifying a fault of the radio link based on an acquired statistical information from among a plurality of faults associated with a plurality of statistical information beforehand.

According to an aspect of the present invention, there is provided with a computer program storage medium storing a computer program for causing a computer to identify a fault of a radio link between a radio terminal and a radio base station, to execute instructions to perform:

acquiring statistical information indicating a state of the radio link between the radio terminal and the radio base station from at least one of the radio terminal and the radio base station; and identifying a fault of the radio link based on an acquired statistical information from among a plurality of faults associated with a plurality of statistical information beforehand.

BRIEF DESCRIPTION OF THE DRAWINGS

FIG. 24 shows a table showing a relationship between faults and statistical information.

DETAILED DESCRIPTION OF THE INVENTION

Hereafter, an embodiment according to the present invention will be explained with reference to the accompanying drawings.

Figure 1:
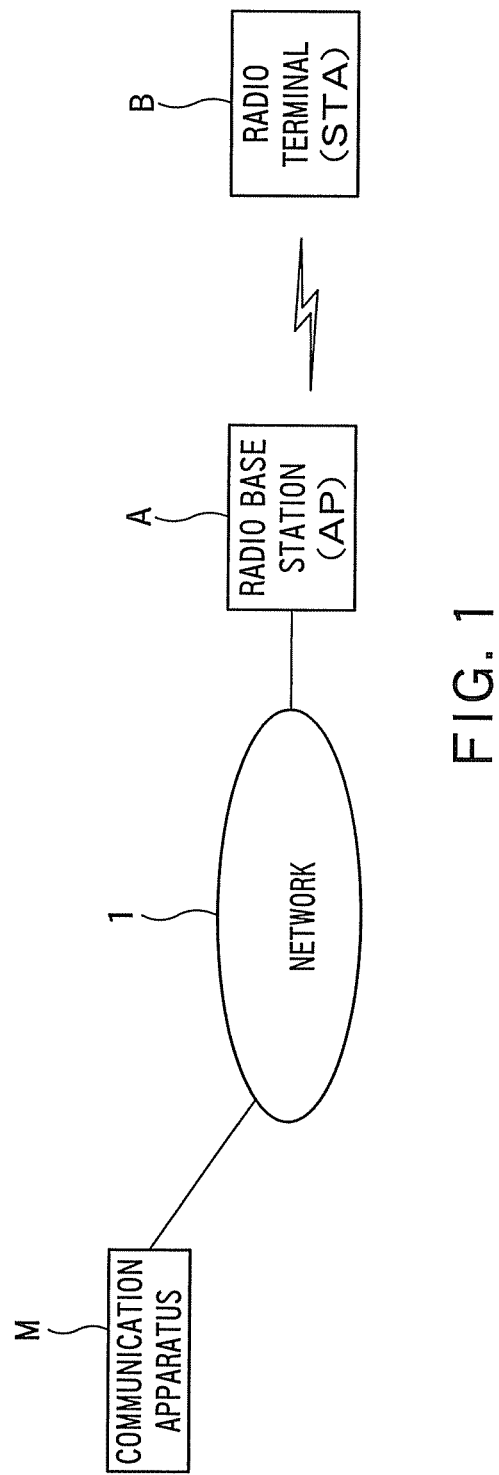
FIG. 1 shows a configuration example of a communication system according to an embodiment of the present invention.

FIG. 1 shows a configuration example of a communication system according to an embodiment of the present invention. In FIG. 1, reference numeral 1 denotes a network, reference character "M" denotes a communication apparatus (host) connected to the network 1, "A" denotes a radio base station (hereinafter may also be referred to as an "AP") connected to the network 1. Reference numeral 2 denotes a radio link and reference character "B" denotes a radio terminal (hereinafter may also be referred to as "STA") connected to the radio link 2. FIG. 1 shows only one radio terminal B connected to the radio base station A, but a plurality of radio terminals may also be connected to the radio base station A.

Figure 2:
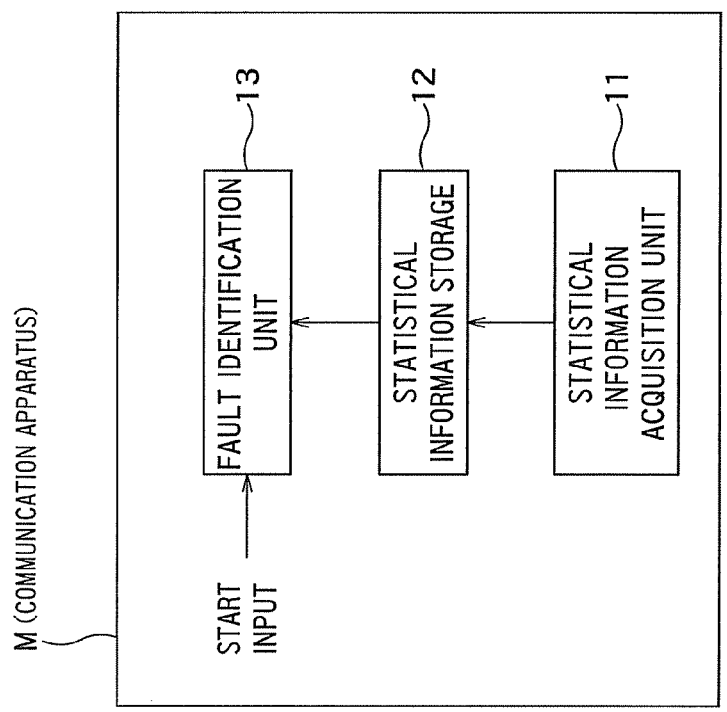
FIG. 2 is a block diagram showing a configuration example of a communication apparatus according to the embodiment.

FIG. 2 shows a configuration example of the communication apparatus M. As shown in FIG. 2, the communication apparatus M of the present embodiment is provided with a statistical information acquisition unit 11 that acquires statistical information indicating a status of the radio link between the radio terminal and radio base station, a statistical information storage 12 that stores the statistical information acquired by the statistical information acquisition unit 11 together with time information and a fault identification unit 13 that identifies the type of fault of the radio link from the statistical information stored in the statistical information storage 12. The statistical information acquisition unit 11, statistical information storage 12 and fault identification unit 13 may be configured as hardware or may also be configured as a software module (computer program) executed on the communication apparatus M or radio base station A or radio terminal B. The computer program may be stored in a computer program storage medium like CD-ROM, Memory card and Hard-disk Drive etc, and the computer program may be read out and executed from the computer program storage medium by a computer having a CPU and a memory.

Hereinafter, an example of the statistical information acquired by the statistical information acquisition unit 11 will be explained.

<Example of Statistical Information>

(1) RSSI (Received Signal Strength Indicator) value (2) Channel Load (3) Frequency of failures to receive ACK (ACKnowledgement) frame (4) Reception frequency of duplicate data frames (5) Reception frequency of RTS (Request To Send) frames The RSSI value in (1) is a value indicating signal intensity of a received signal. For example, when an obstacle exists between the STA and AP and mutual radio signals do not arrive, the RSSI value decreases. The RSSI value corresponds, for example, to intensity of a received wave.

The Channel Load in (2) is a ratio of a time judged through carrier sense to be busy for every predetermined time. The Channel Load increases when other STAs/APs or the like are communicating. For example, when many STAs are accessing and communicating with a certain AP or when an STA that generates large traffic exists, the increase rate increases. Furthermore, a NAV (Network Allocation Vector: transmission prohibition period) is also included in a busy state, and therefore the Channel Load also increases when an RTS frame is received.

Figure 5:
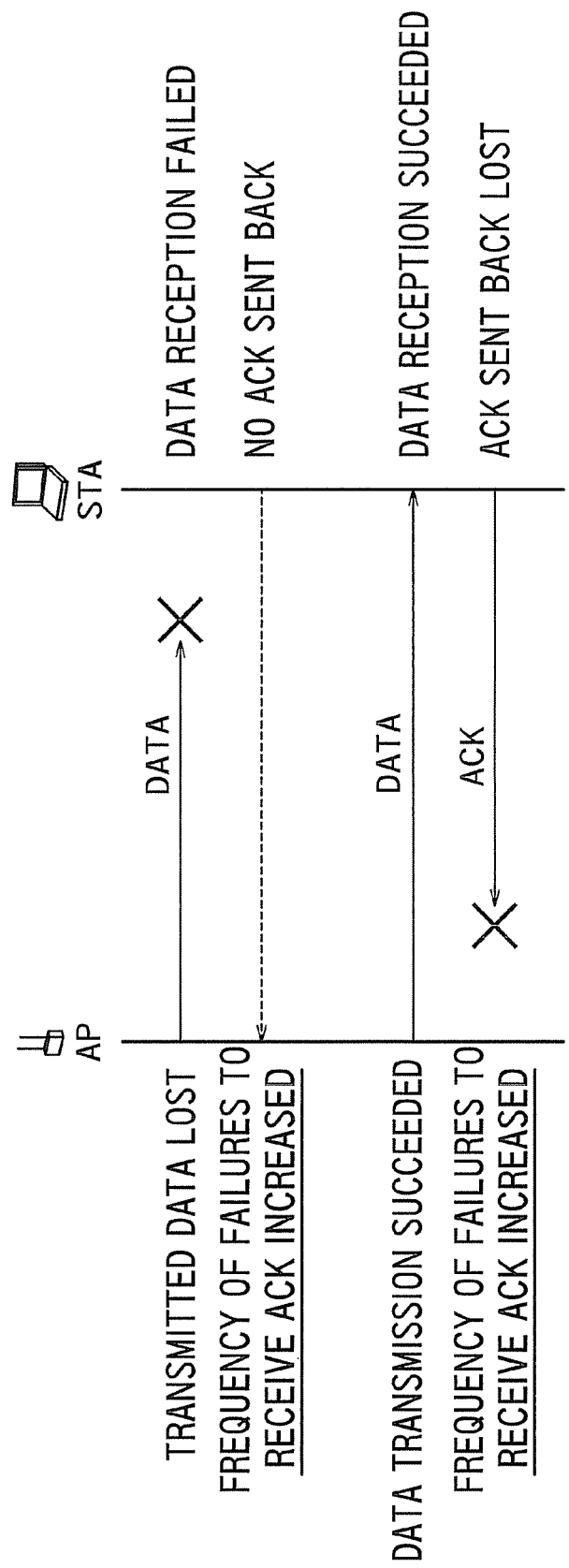
FIG. 5 illustrates a case where the frequency of failures to receive an ACK frame increases.

The frequency of failures to receive an ACK frame in (3) refers to the number of times no ACK frame is received from the other party even when the sender has sent a data frame (DATA frame) and is a statistical value that can be obtained from the sender of the data frame. FIG. 5 shows a case where the frequency of failures to receive an ACK frame increases. This frequency increases when a DATA frame sent from the AP to the STA is lost and also increases when ACK is lost even when the DATA frame normally arrives at the STA. However, this frequency does not increase when the transmission of the DATA frame per se cannot be realized in a situation in which the Channel Load is high or the like.

Figure 6:
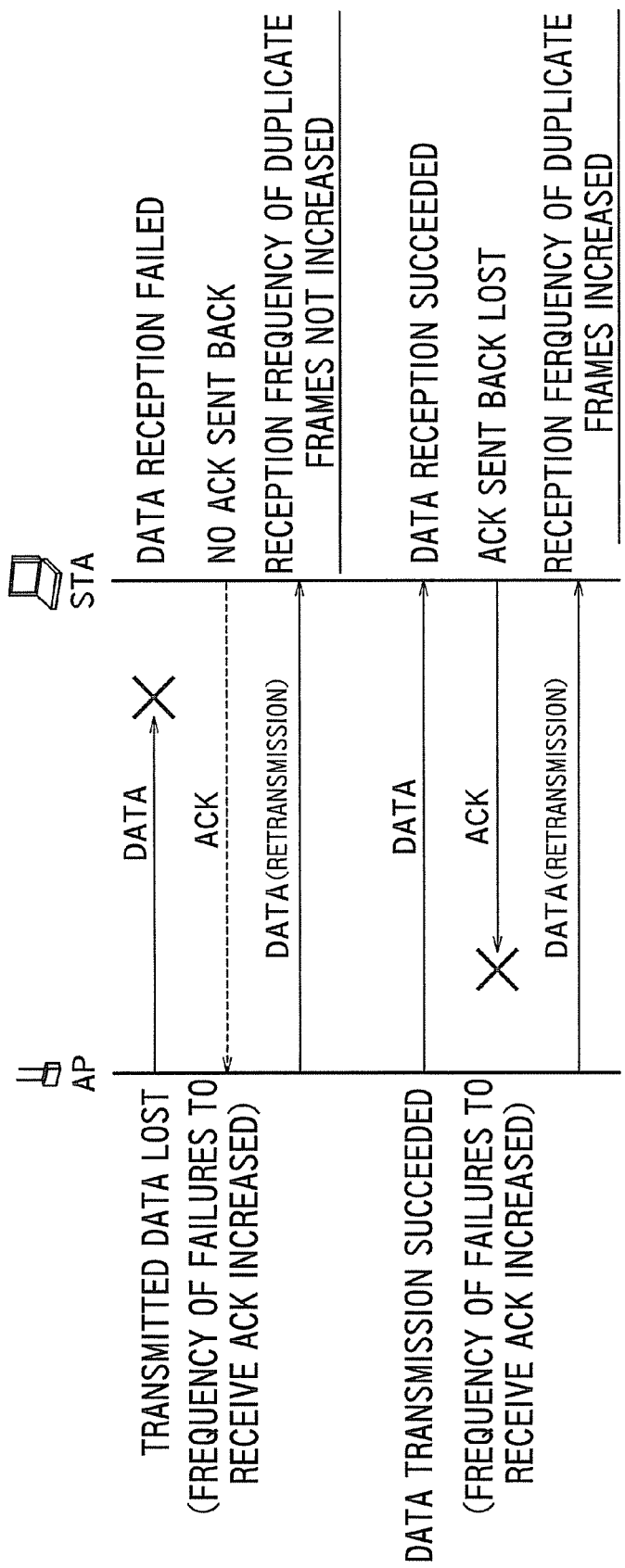
FIG. 6 illustrates a case where the frequency of failures to receive a duplicate frame increases.

The reception frequency of duplicate frames in (4) refers to the number of times a data frame (duplicate data frame) identical to an already received data frame has been received, and is a statistical value that can be acquired from the receiver of the data frame. FIG. 6 shows a case where the reception frequency of duplicate frames increases. A frame judged to be a duplicate frame is a frame which has already been received. That is, when a DATA frame is lost, a retransmission frame is not judged as a duplicate frame, whereas when an ACK frame is lost, a retransmission frame is judged as a duplicate frame. In this way, by observing the reception frequency of duplicate frames, it is possible to judge a state in which the DATA frame arrives normally but the ACK frame is lost. Furthermore, by combining this with the frequency of failures to receive an ACK frame, it is possible to judge a state in which the ACK frame is normally received but the DATA frame is lost. That is, since a loss situation can be judged with the type of DATA or ACK being discriminated, it is possible to use the reception frequency of duplicate frames to discriminate, for example, interference whereby only a DATA frame is lost such as a hidden terminal for which carrier sense does not operate from interference such as multipath fading and non-IEEE802.11 interference whereby both DATA and ACK frames are lost.

Figure 7:
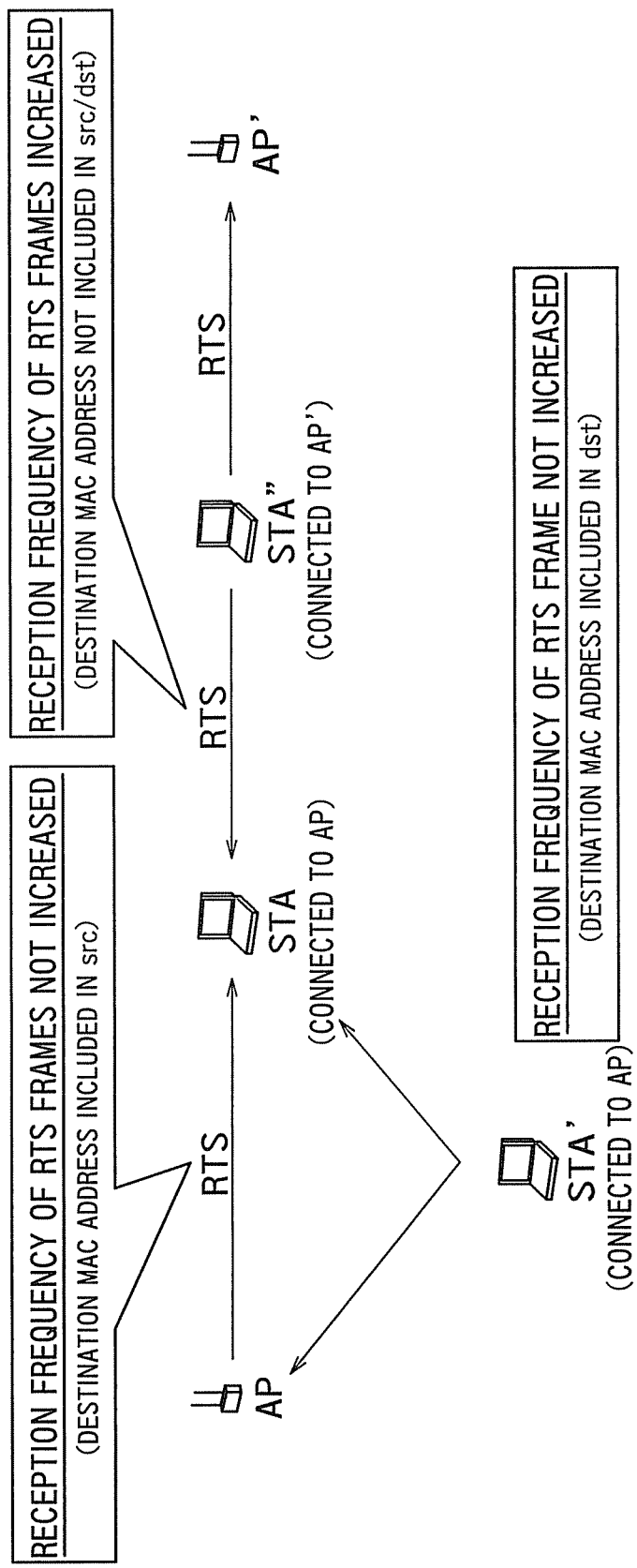
FIG. 7 illustrates a case where the frequency of received RTS frames increases.

The reception frequency of RTS frames in (5) refers to the number of times an RTS frame which includes the destination MAC address neither in the destination address (dst) nor in the source address (src) has been received. FIG. 7 shows a case where the reception frequency of RTS frames increases. When an STA connected to an AP receives an RTS frame from an STA (STA" in FIG. 7) connected to a different AP (AP' in FIG. 7), the reception frequency of RTS frames increases.

Figure 3:
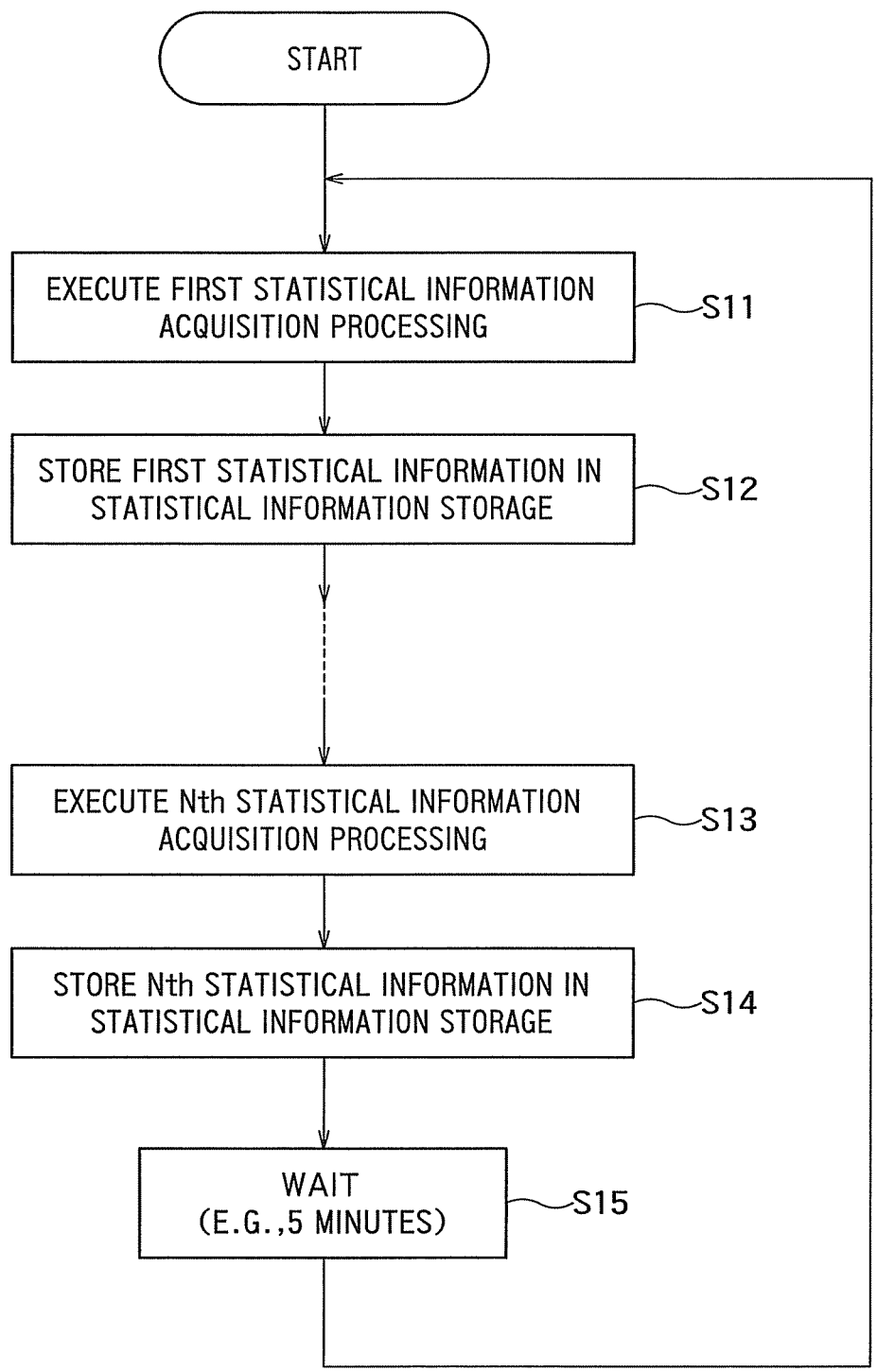
FIG. 3 is a flowchart showing an example of operation procedure of the statistical information acquisition unit of the communication apparatus in FIG. 2.

FIG. 3 shows an example of the procedure of the statistical information acquisition unit 11.

First, processing of acquiring predetermined first statistical information is executed (step S11). The acquisition processing is performed by acquiring statistical information from the radio base station and radio terminal via a network. For example, statistical information of the radio base station and radio terminal can be collected via the network using, for example, SNMP (Simple Network Management Protocol) and CAPWAP (Control And Provisioning of Wireless Access Points) which are Internet protocols.

Next, the first statistical information acquired by the statistical information acquisition unit 11 is stored in the statistical information storage together with time information (step S12). Hereinafter, a procedure similar to steps S11 and S12 will be repeatedly executed until acquisition processing and storage processing of predetermined Nth statistical information are performed (steps S13 and S14).

Finally, to periodically acquire statistical information, the process is returned to step S11 after a predetermined time of wait (step S15). Here, the periodic interval is generally five minutes according to, for example, a statistical acquisition tool on the Internet. Furthermore, it is also possible to keep the periodic interval constant and improve accuracy by determining the wait time in step S15 in synchronization with a periodic timer. Furthermore, though FIG. 3 shows an example where all statistical information is acquired at the same periodic interval, but a method of setting and acquiring an individual periodic interval for each piece of statistical information may also be adopted. Furthermore, for statistical information that varies in an extremely short time such as an RSSI value, a mean value, maximum value, minimum value, standard deviation or the like may be measured on the radio base station and radio terminal and these values may be acquired by the statistical information acquisition unit.

Figure 4:
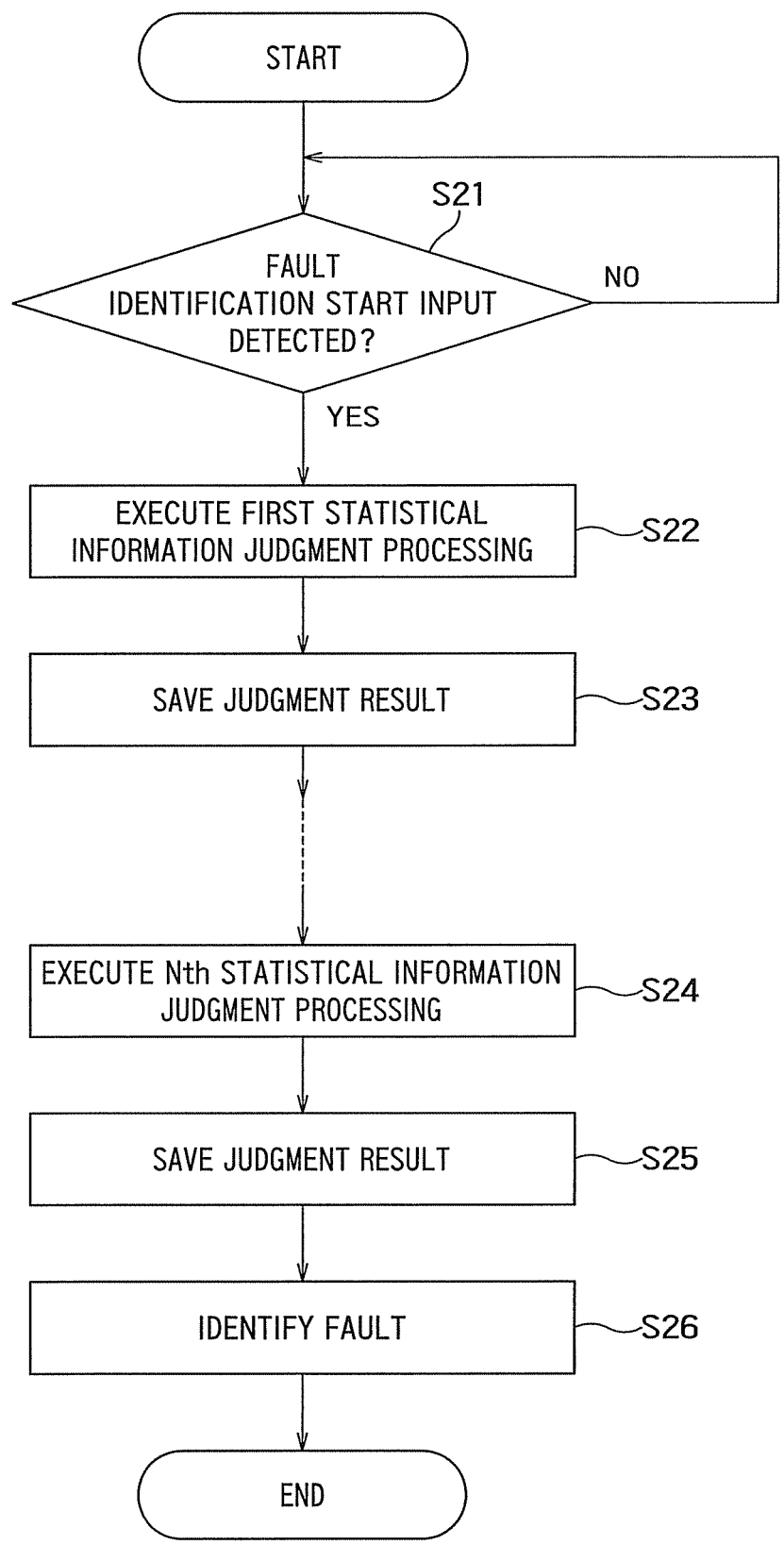
FIG. 4 is a flowchart showing an example of operation procedure of the fault identification unit of the communication apparatus in FIG. 2.

FIG. 4 shows an example of the procedure of the fault identification unit 13.

First, the fault identification unit 13 detects an input to start processing (step S21). Examples of the start input include periodic input from a periodic timer or the like and a specific instruction from an administrator. As in the former, when the start input is periodically given to the fault identification unit 13, it is possible to periodically monitor a situation in which a fault occurs, while as in the latter, when an instruction from the administrator is given as the start input, the administrator can identify the fault on demand and in real time.

When the start input is received, it is judged whether or not predetermined first statistical information has exceeded a threshold (step S23). Here, the threshold is predetermined for each piece of statistical information and is set, for example, as follows.

<Example of Threshold Setting>
(1) RSSI value [dBm]: 10
(2) Channel Load [%]: 50
(3) Frequency of failures to receive ACK frame [average frequency of failures for 5 minutes]: 100
(4) Reception frequency of duplicate data frames [average number of receptions for 5 minutes]: 100
(5) Reception frequency of RTS frames [average number of receptions for 5 minutes]: 100

The example where a value comparable with the current value is adopted as the threshold is shown here, but, for example, a variation width per unit time may also be adopted.

Next, the fault identification unit 13 saves the judgment result (step S23). A procedure similar to steps S22 and S23 is repeatedly executed until the Nth statistical information is judged and saved (steps S24 and S25).

Finally, the combination of the saved judgment results is compared with a combination predetermined for each fault. As a result of the comparison, if the fault having the same combination exists, it can be identified as the fault (step S26).

Table 1 in FIG. 24 shows examples of combinations of judgment results predetermined for each fault. Here "Increased" in Table 1 means that a set threshold is exceeded and "Decreased" means that a set threshold is not reached. When the combination of "Increased" and "Decreased" in the statistical information of Table 1 matches the combination of the judgment results, such a case is identified as a case where the corresponding fault has occurred.

Hereinafter, the relationship between the faults and the respective pieces of statistical information will be explained.

Figure 8:
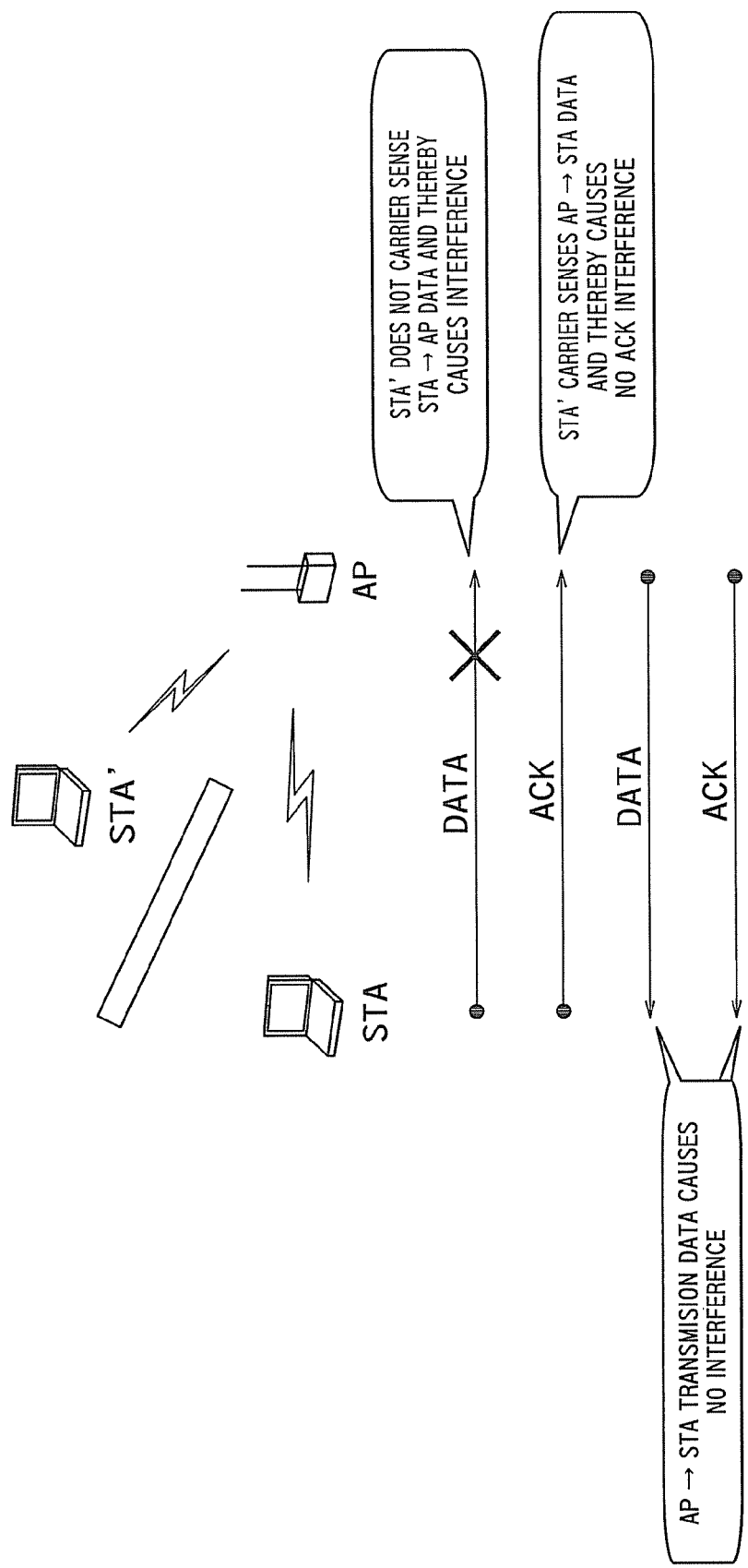
FIG. 8 shows a network configuration in which a hidden terminal (STA) has occurred.
Figure 9:
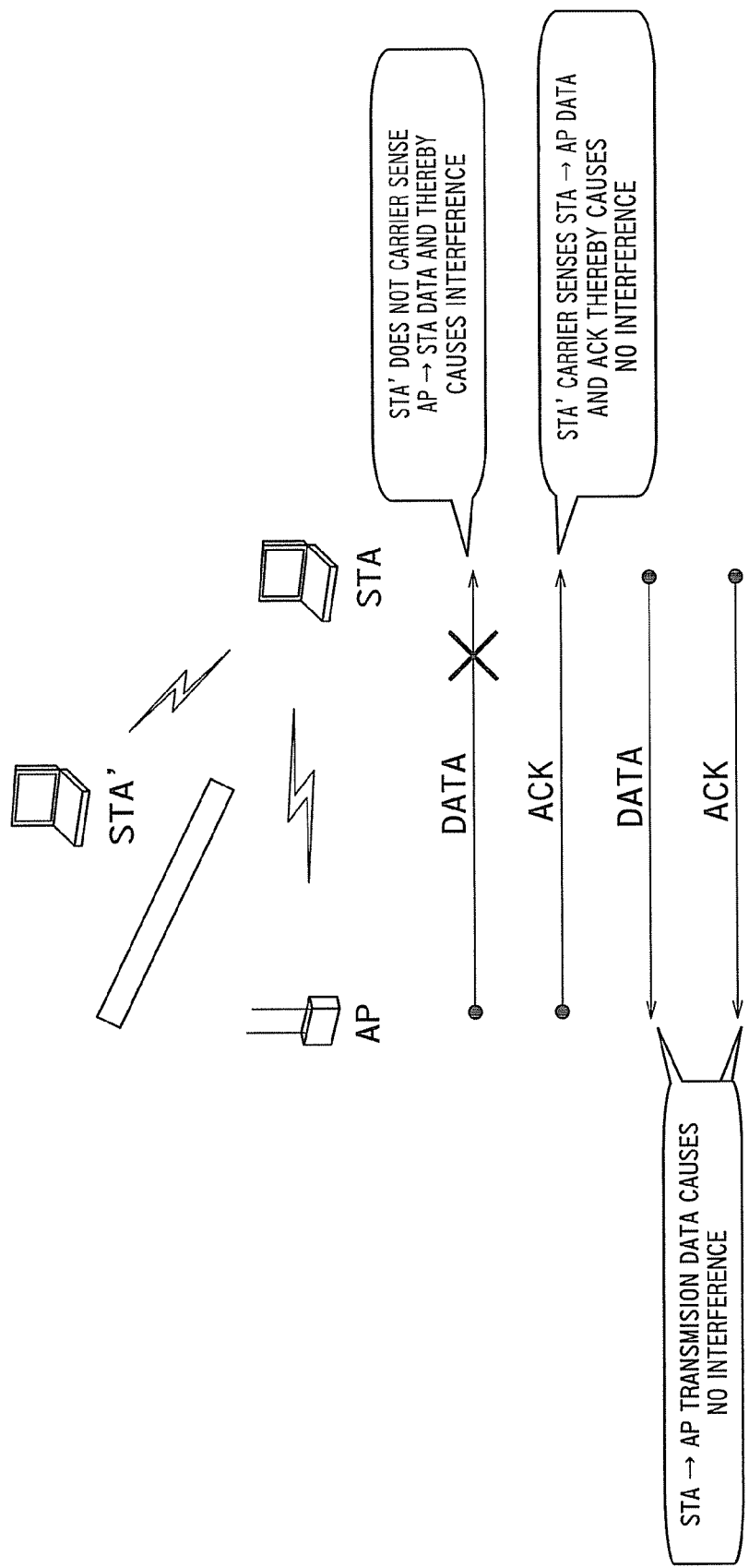
FIG. 9 shows a network configuration in which a hidden terminal (AP) has occurred.

The "hidden terminals" are defined as terminals in which mutual radio signals do not arrive due to influences of distance, obstacles that block radio wave or the like and carrier sense is not functioning. FIG. 8 shows a network configuration in which an STA and an STA' mutually become hidden terminals. In FIG. 8, carrier senses of the STA and STA' do not function and though the STA is sending a data frame to the AP, the STA' sends a data frame to the AP, and as a result, the frames collide with each other, causing interference. A feature in this case is that interference occurs only in the DATA frame sent from the STA to the AP and the ACK frame sent from the STA to the AP does not interfere. This is because the carrier sense of the STA' functions for the DATA frame which becomes the source of the ACK frame (DATA frame sent from the AP to the STA) and avoids transmission of a frame colliding with the ACK frame. Therefore, it is a state in which only the DATA frame interferes that hidden terminals become a fault and only the frequency of failures to receive an ACK frame on the STA increases. Here, the configuration in which the STA suffers damage caused by the hidden terminals has been shown, but there can also be a configuration in FIG. 9 in which the AP suffers damage caused by the hidden terminals likewise. In this case, only the frequency of failures to receive an ACK frame on the AP increases.

Figure 10:
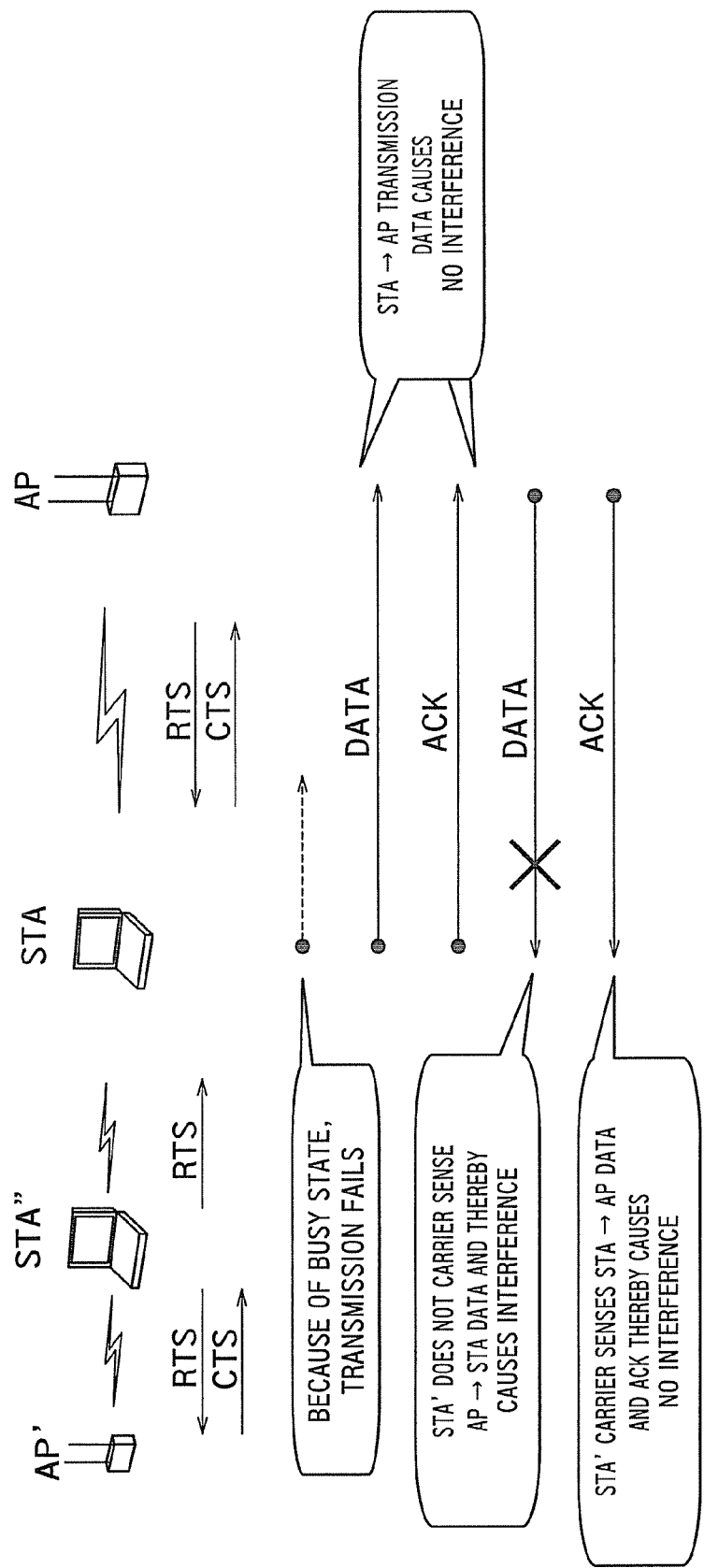
FIG. 10 shows a network configuration in which an exposed terminal (STA) has appeared.
Figure 11:
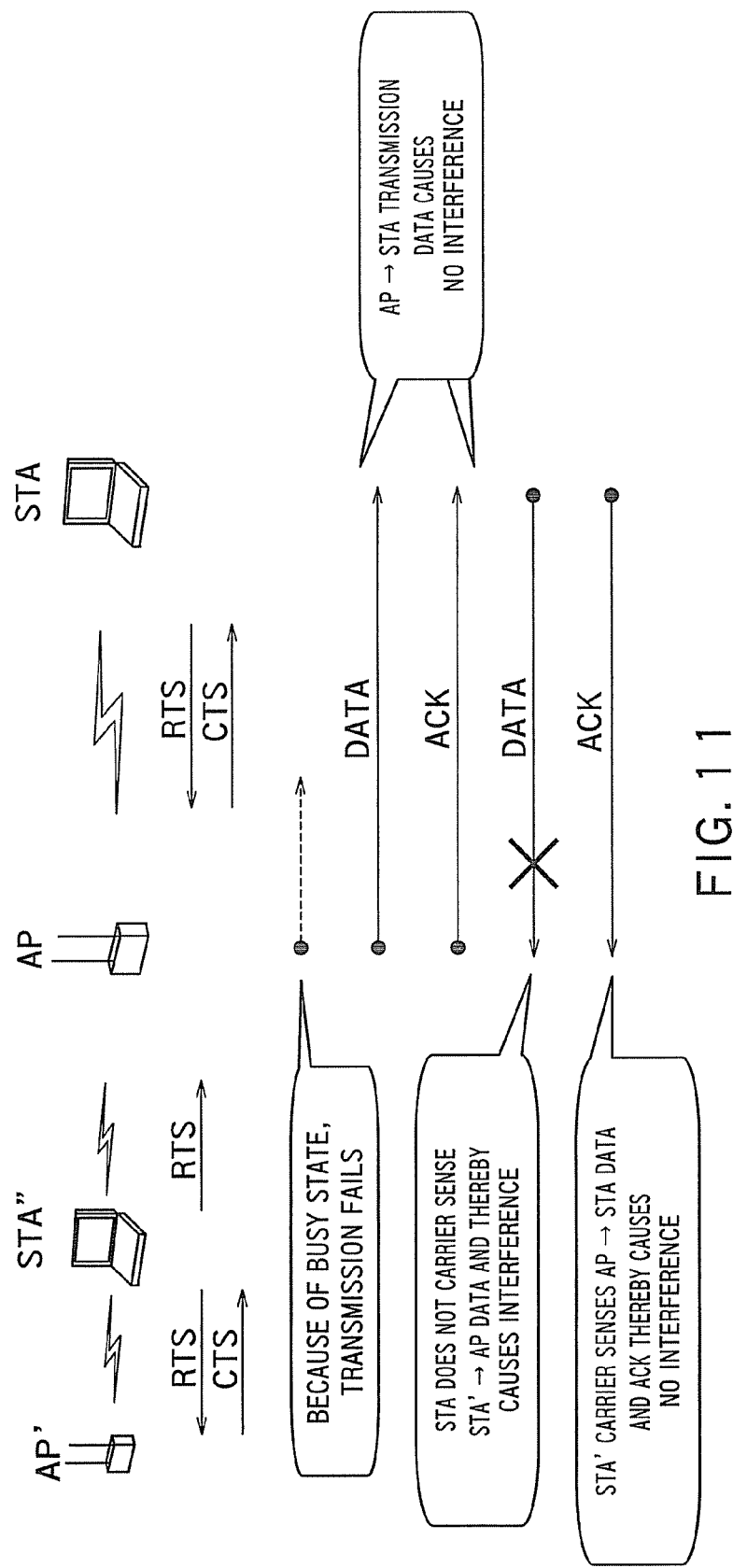
FIG. 11 shows a network configuration in which an exposed terminal (AP) has appeared.

The "exposed terminal" is defined as a terminal that transitions to a waiting state of a NAV (Network Allocation Vector: transmission prohibition period) by receiving an RTS frame sent by the STA connected to a different AP in a wireless LAN system in which RTS (Request To Send)/CTS (Clear To Send) is functioning. FIG. 10 shows a network configuration in which an STA becomes an exposed terminal with respect to an STA". An AP uses the same channel as that of an AP', the STA is connected to the AP and the STA" is connected to the AP'. At this moment, the STA may receive an RTS frame sent by the STA" to the AP' and in this case, though the utilization rate of the cell to which the STA belongs is low, the STA may transition to a waiting state of NAV and communication performance deteriorates. Therefore, when the exposed terminal becomes a fault, the reception frequency of RTS frames received on the STA (RTS frame in which the MAC address of the AP is included neither in the destination address (dst) nor in the source address (src)) and Channel Load increase. Furthermore, since the STA" becomes a hidden terminal for the AP, a DATA frame sent from the AP to the STA interferes. That is, the frequency of failures to receive an ACK frame on the AP increases. The configuration in which the STA becomes the exposed terminal is shown here, but likewise there can also be a configuration in FIG. 11 in which the AP becomes an exposed terminal. In this case, the reception frequency of RTS frames received on the AP (RTS frame in which the MAC address of the STA is included neither in the destination address (dst) nor in the source address (src)) and Channel Load increase, and the frequency of failures to receive an ACK frame on the STA increases.

Figure 12:
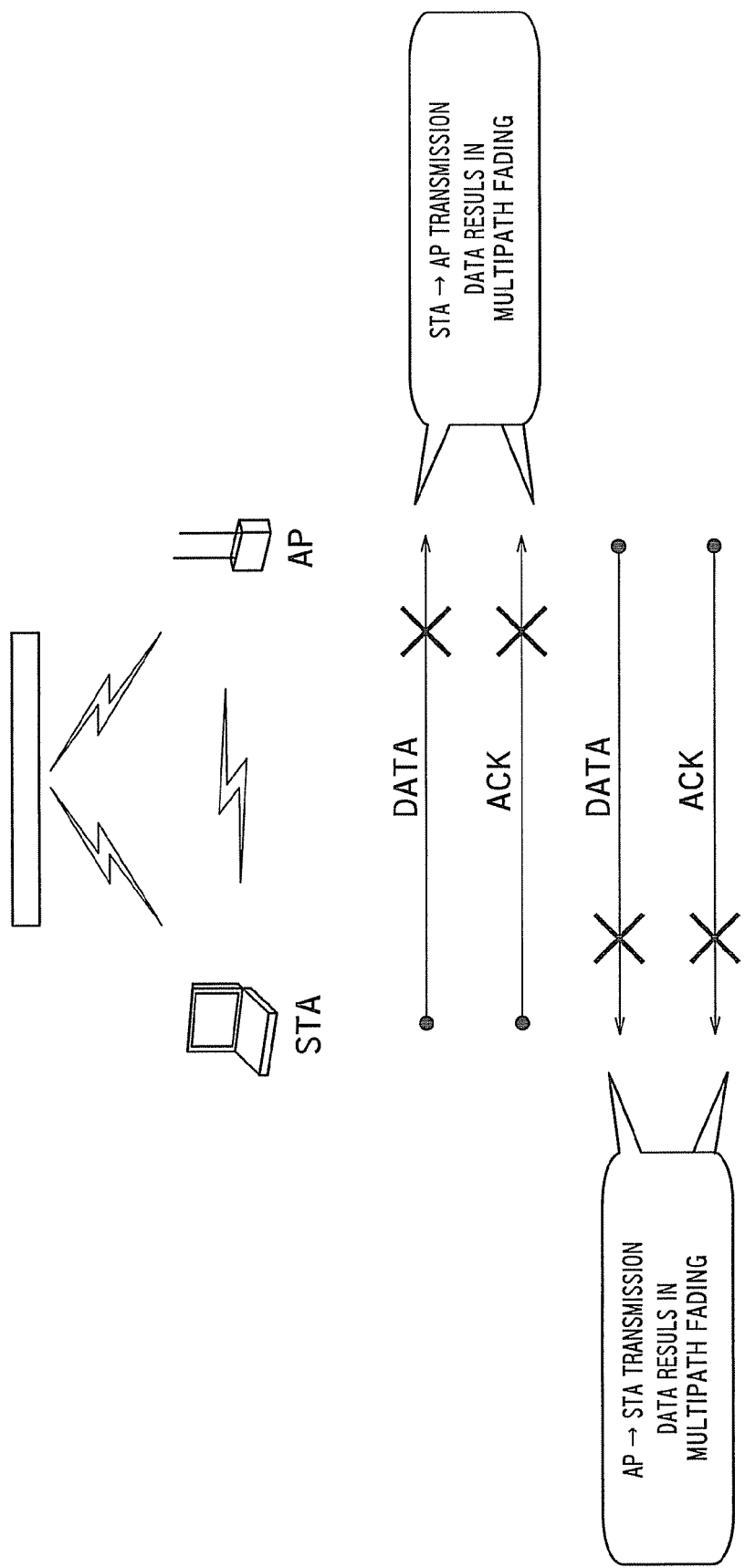
FIG. 12 shows a network configuration in which interference due to multipath fading has occurred.

The "multipath fading" is defined as a state in which in addition to a direct wave sent from the STA, a reflected wave or the like which is reflected by a wall or the like and arrives is generated and as a result of arriving at the receiving side via a plurality of paths and at different times, these waves interfere with each other. FIG. 12 shows a network configuration in which interference due to multipath fading occurs in communication between an STA and an AP. When multipath fading becomes a fault, since both frames of DATA and ACK transmitted/received between the STA and AP interfere, the frequency of failures to receive an ACK frame on the STA and AP and the reception frequency of duplicate frames increase.

Figure 13:
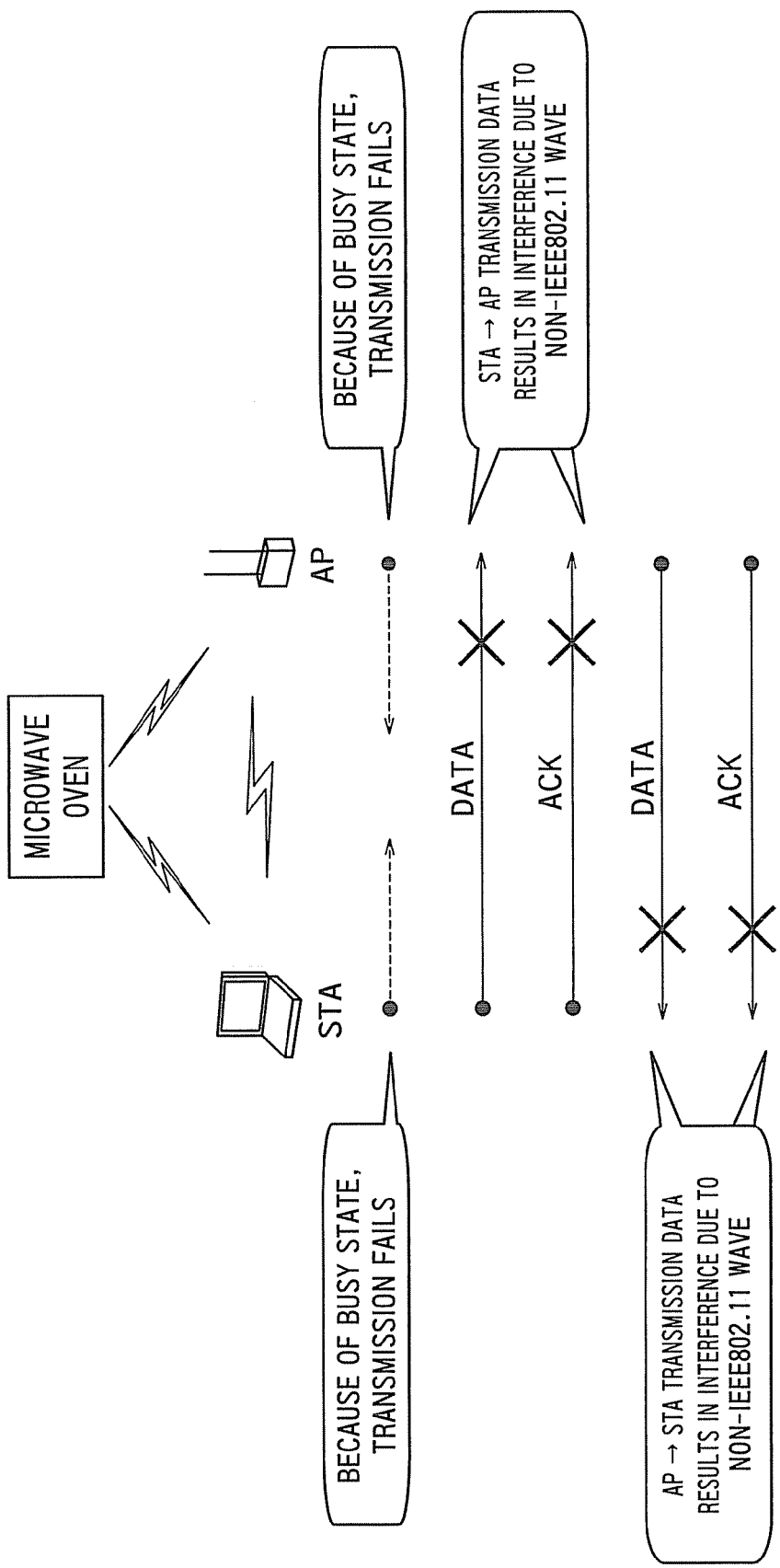
FIG. 13 shows a network configuration in which interference due to non-IEEE802.11 standard wave has occurred.

The "non-IEEE802.11 interference" is defined as a state in which interference is caused by a radio wave such as a microwave oven and Bluetooth™ of the same frequency band, yet of a standard different from IEEE802.11. FIG. 13 shows a network configuration in which interference is caused by a non-IEEE802.11 standard radio wave (e.g., microwave oven). When non-IEEE 802.11 interference occurs, avoidance of collision between both frames of DATA and ACK transmitted/received between the STA and AP frequently occurs and also interferes. Therefore, when non-IEEE802.11 interference becomes a fault, Channel Load on the STA and AP, the frequency of failures to receive an ACK frame and the reception frequency of duplicate frames increase respectively.

Figure 14:
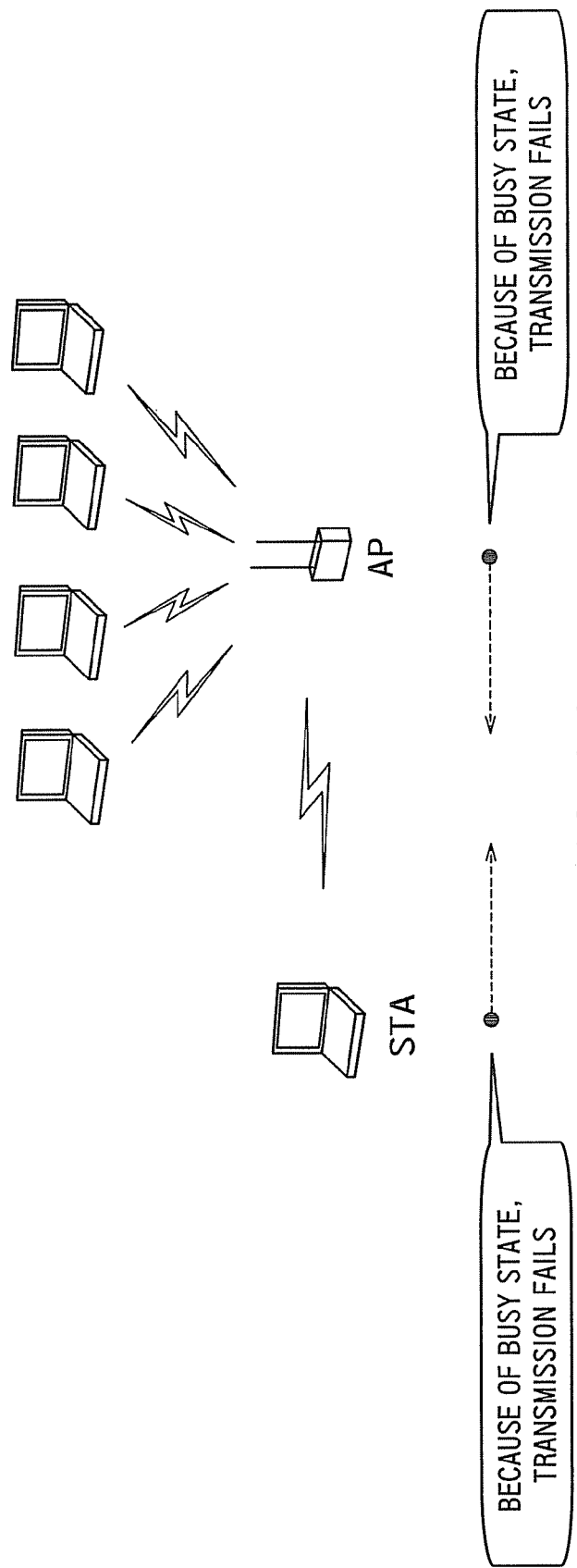
FIG. 14 shows a network configuration in which congestion has occurred.

The "congestion" is defined as a state in which the number of STAs belonging to a certain channel increases and avoidance of collision among all APs and STAs belonging to the channel through carrier sense frequently occurs. FIG. 14 shows a network configuration in which congestion has occurred. A congestion state occurs when users locally gather at a meeting or the like and as a result, many STAs access the same AP simultaneously. Therefore, when congestion becomes a fault, Channel Load on the STA and AP increases. However, since DATA and ACK frames are never lost, the number of other parameters never increases.

Figure 15:
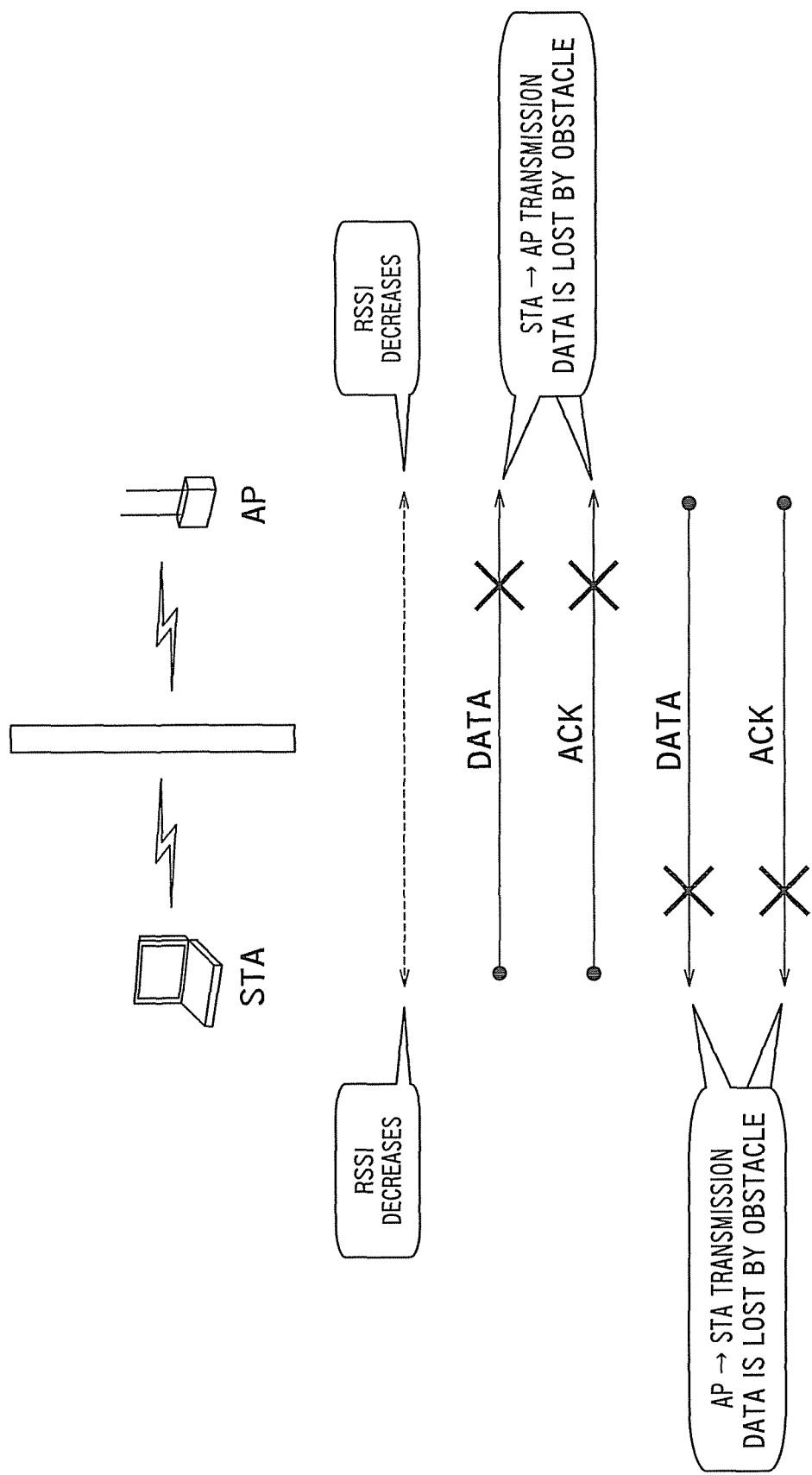
FIG. 15 shows a network configuration in which shadowing occurs.

The "shadowing" is defined as a state in which an obstacle exists between an STA and an AP and mutual radio signals do not arrive. FIG. 15 shows a network configuration in which shadowing occurs. When shadowing occurs, a direct wave does not reach between the STA and AP due to the obstacle, but a reflected wave and diffracted wave reach and communication is carried out using a received signal with reduced signal intensity. Furthermore, since the signal intensity of received data drastically varies, a PLCP header parity error or CRC error occurs. Therefore, when shadowing becomes a fault, the RSSI value on the STA and AP decreases and both the frequency of failures to receive an ACK frame and the reception frequency of duplicate frames increase.

Hereinafter, the procedure for identifying the fault in step S26 in FIG. 4 will be explained for each fault in Table 1.
<Identification of Hidden Terminal (STA)>

Figure 16:
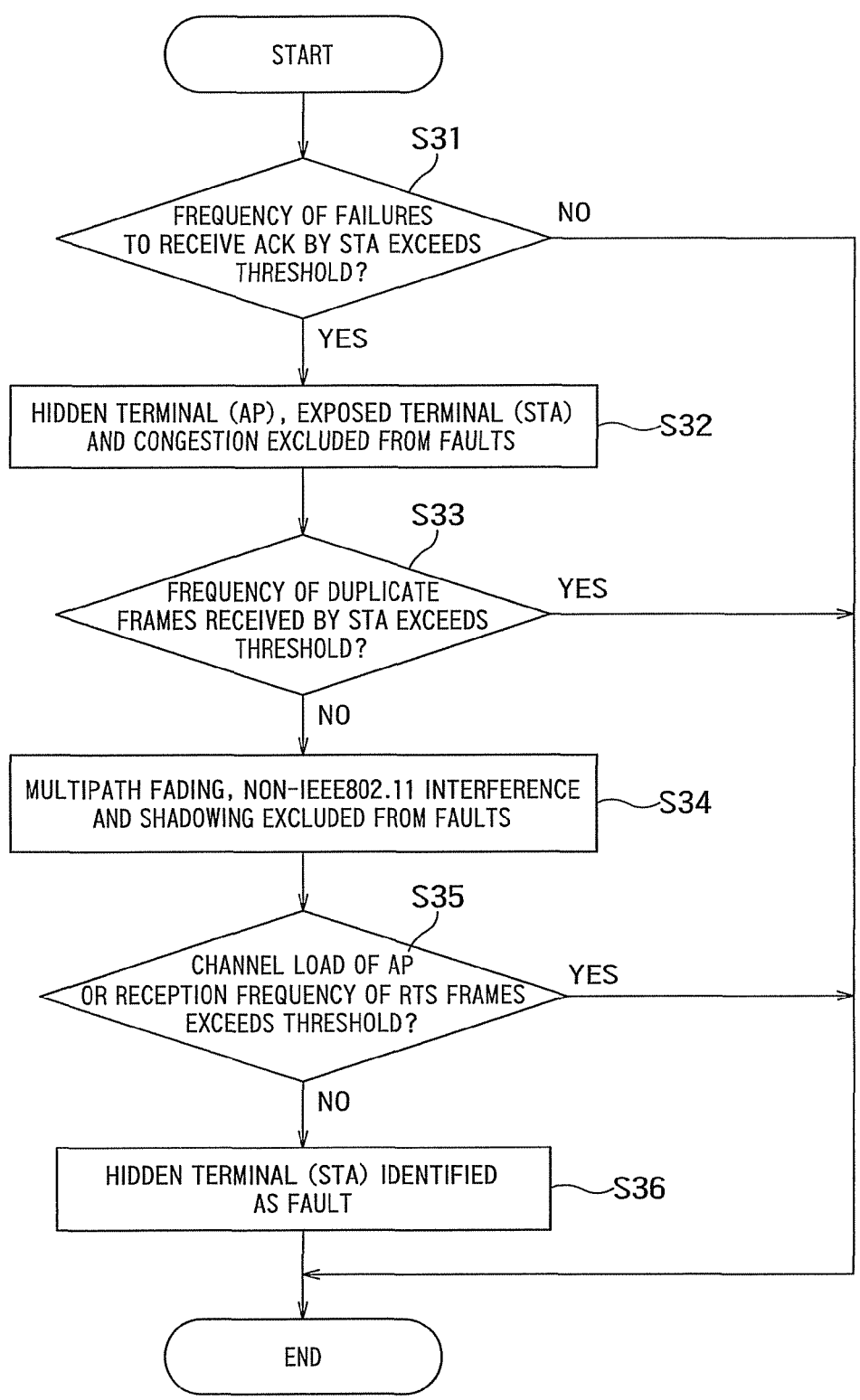
FIG. 16 is a flowchart showing a procedure for identifying a hidden terminal (STA)

FIG. 16 shows a flowchart of a procedure for identifying a hidden terminal (STA). First, the frequency of failures to receive ACK on an STA is judged (step S31). When the frequency of failures to receive ACK on the STA exceeds a threshold (ACK threshold), hidden terminal (AP), exposed terminal (STA) and congestion are excluded from faults (step S32). Next, the reception frequency of duplicate frames received on the STA is judged (step S33). If the reception frequency of duplicate frames does not exceed the threshold (duplicate threshold), multipath fading, non-IEEE802.11 interference and shadowing are excluded from faults (step S34). Next, any one of Channel Load on the AP (base station side channel load) and the reception frequency of RTS frames received on the AP is judged (step S35). When Channel Load or the reception frequency of RTS frames does not exceed a threshold (channel threshold or RTS threshold), there is no possibility that exposed terminals (AP) may be the faults, and hidden terminals (STA) are confirmed to be the fault and can be identified as such (step S36). The identification accuracy can be improved by adding and executing judgment of other than the statistical information shown here.
<Identification of Hidden Terminal (AP)>

Figure 17:
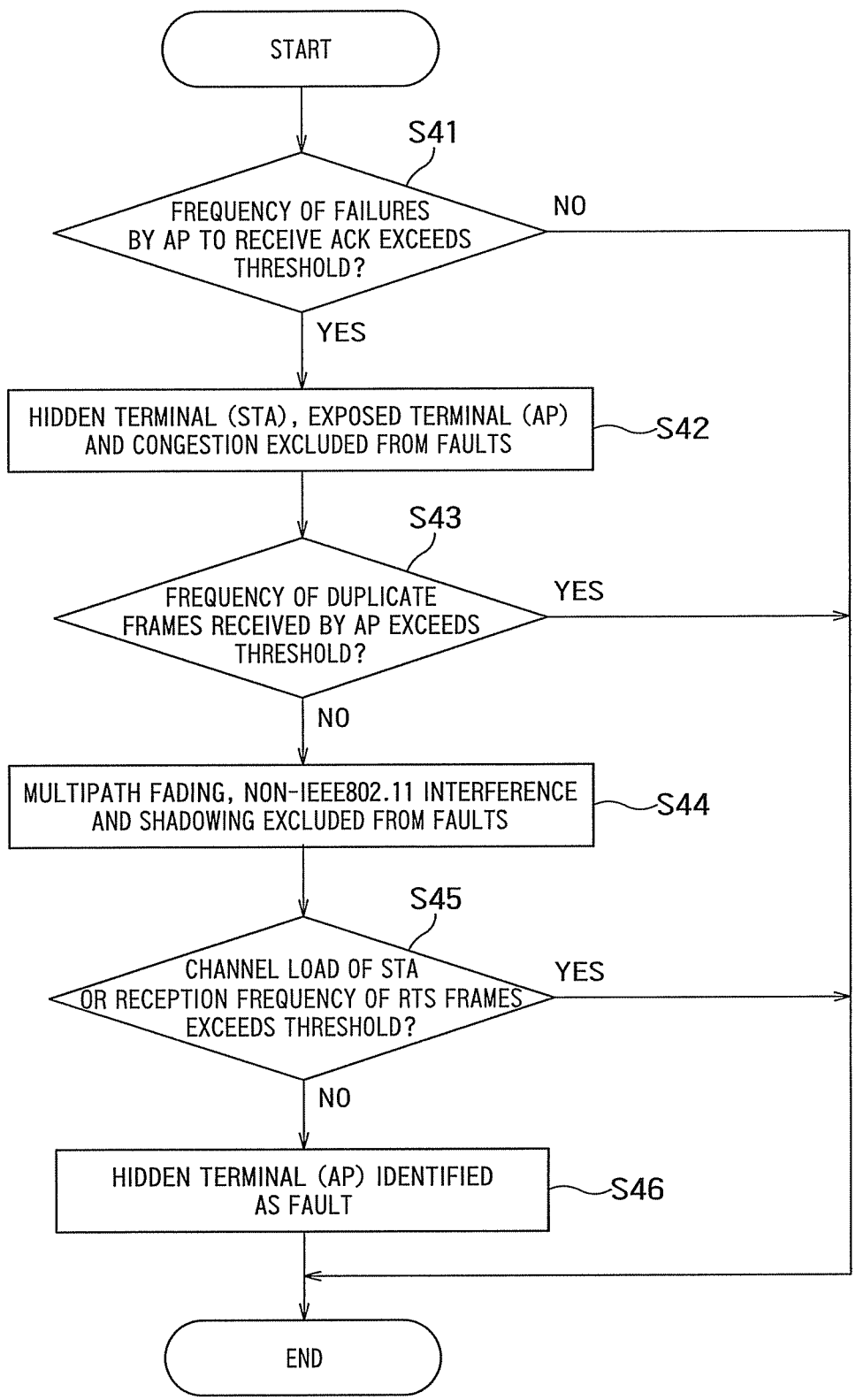
FIG. 17 is a flowchart showing a procedure for identifying a hidden terminal (AP)

FIG. 17 shows a flowchart for a procedure for identifying hidden terminals (AP). First, the frequency of failures to receive ACK on an AP is judged (step S41). If the frequency of failures to receive ACK exceeds a threshold (ACK threshold), hidden terminal (STA), exposed terminal (AP) and congestion are excluded from faults (step S42). Next, the reception frequency of duplicate frames received on the AP is judged (step S43). If the reception frequency of duplicate frames does not exceed a threshold (duplicate threshold), multipath fading, non-IEEE802.11 interference and shadowing are excluded from the faults (step S44). Next, any one of Channel Load on the STA (terminal side channel load) or the reception frequency of RTS frames received on the STA is judged (step S45). If Channel Load or the reception frequency of RTS frames does not exceed a threshold (channel threshold or RTS threshold), there is no possibility that exposed terminals (STA) may be the faults, and hidden terminals (AP) are confirmed to be the fault and can be identified as such (step S46). The identification accuracy can be improved by adding and executing judgment of other than the statistical information shown here.
<Identification of Exposed Terminal (STA)>

Figure 18:
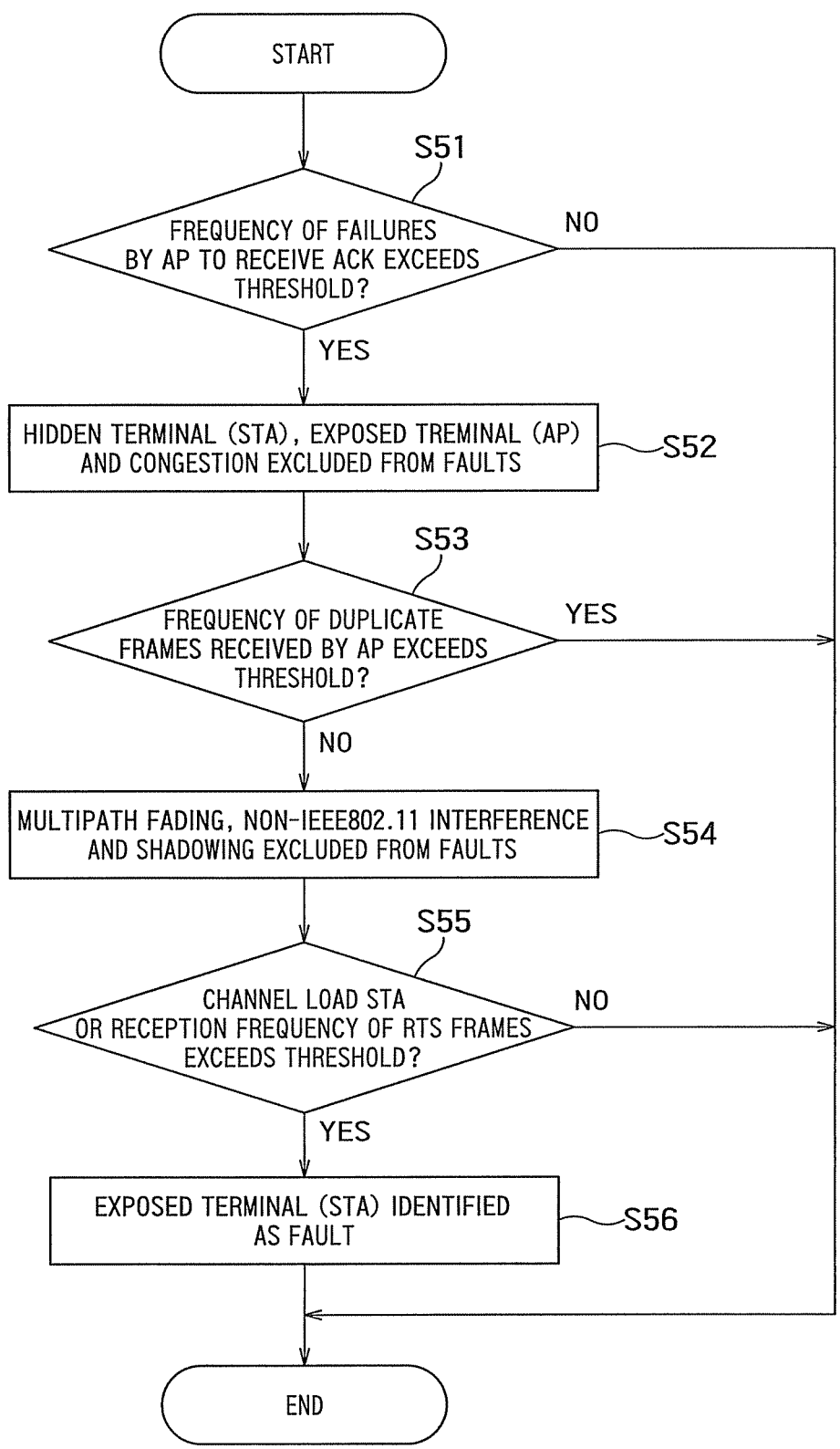
FIG. 18 is a flowchart showing a procedure for identifying an exposed terminal (STA)

FIG. 18 shows a flowchart showing a procedure for identifying an exposed terminal (STA). First, the frequency of failures to receive ACK on an AP is judged (step S51). If the frequency of failures to receive ACK exceeds a threshold (ACK threshold), hidden terminal (STA), exposed terminal (AP) and congestion are excluded from faults (step S52). Next, the reception frequency of duplicate frames received on the AP is judged (step S53). If the reception frequency of duplicate frames does not exceed a threshold (duplicate threshold), multipath fading, non-IEEE 802.11 interference and shadowing are excluded from the faults (step S54). Next, any one of Channel Load on the STA or the reception frequency of RTS frames is judged (step S55). If Channel Load or the reception frequency of RTS frames exceeds a threshold (channel threshold or RTS threshold), there is no possibility that hidden terminals (AP) may be the faults, and exposed terminals (STA) are confirmed to be the fault and can be identified as such (step S56). The identification accuracy can be improved by adding and executing judgment of other than the statistical information shown here.
<Identification of Exposed Terminal (AP)>

Figure 19:
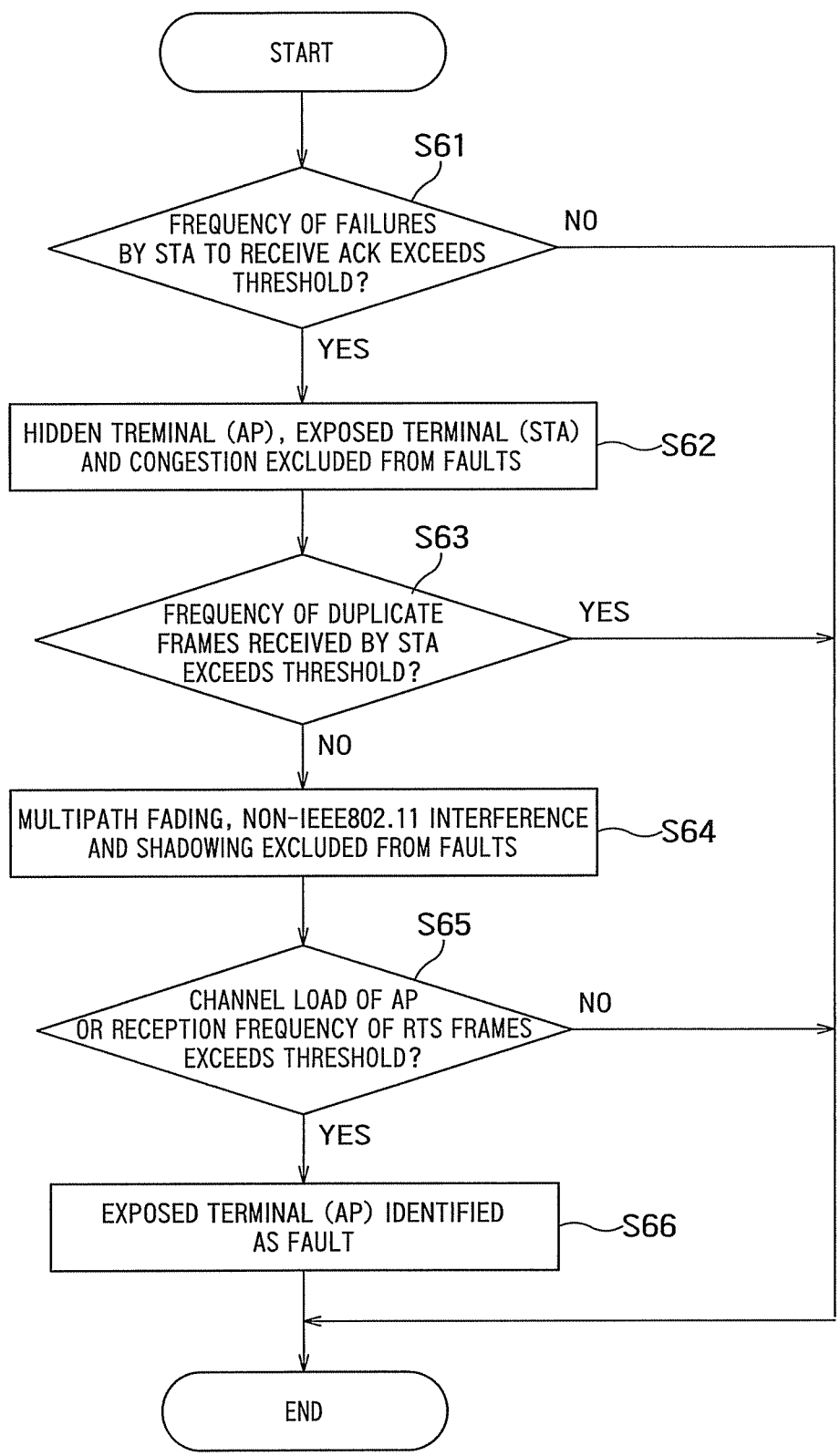
FIG. 19 is a flowchart showing a procedure for identifying an exposed terminal (AP)

FIG. 19 shows a flowchart of a procedure for identifying an exposed terminal (AP). First, the frequency of failures to receive ACK on an STA is judged (step S61). If the frequency of failures to receive ACK exceeds a threshold (ACK threshold), hidden terminal (AP), exposed terminal (STA) and congestion are excluded from faults (step S62). Next, the reception frequency of duplicate frames received on the STA is judged (step S63). If the reception frequency of duplicate frames does not exceed a threshold (duplicate threshold), multipath fading, non-IEEE 802.11 interference and shadowing are excluded from the faults (step S64). Next, any one of Channel Load on the AP and the reception frequency of RTS frames is judged (step S65). If Channel Load or the reception frequency of RTS frames exceeds a threshold (channel threshold or RTS threshold), there is no possibility that hidden terminals (STA) may be the faults, and exposed terminals (AP) are confirmed to be the fault and can be identified as such (step S66). The identification accuracy can be improved by adding and executing judgment of other than the statistical information shown here.

<Identification of Multipath Fading>

Figure 20:
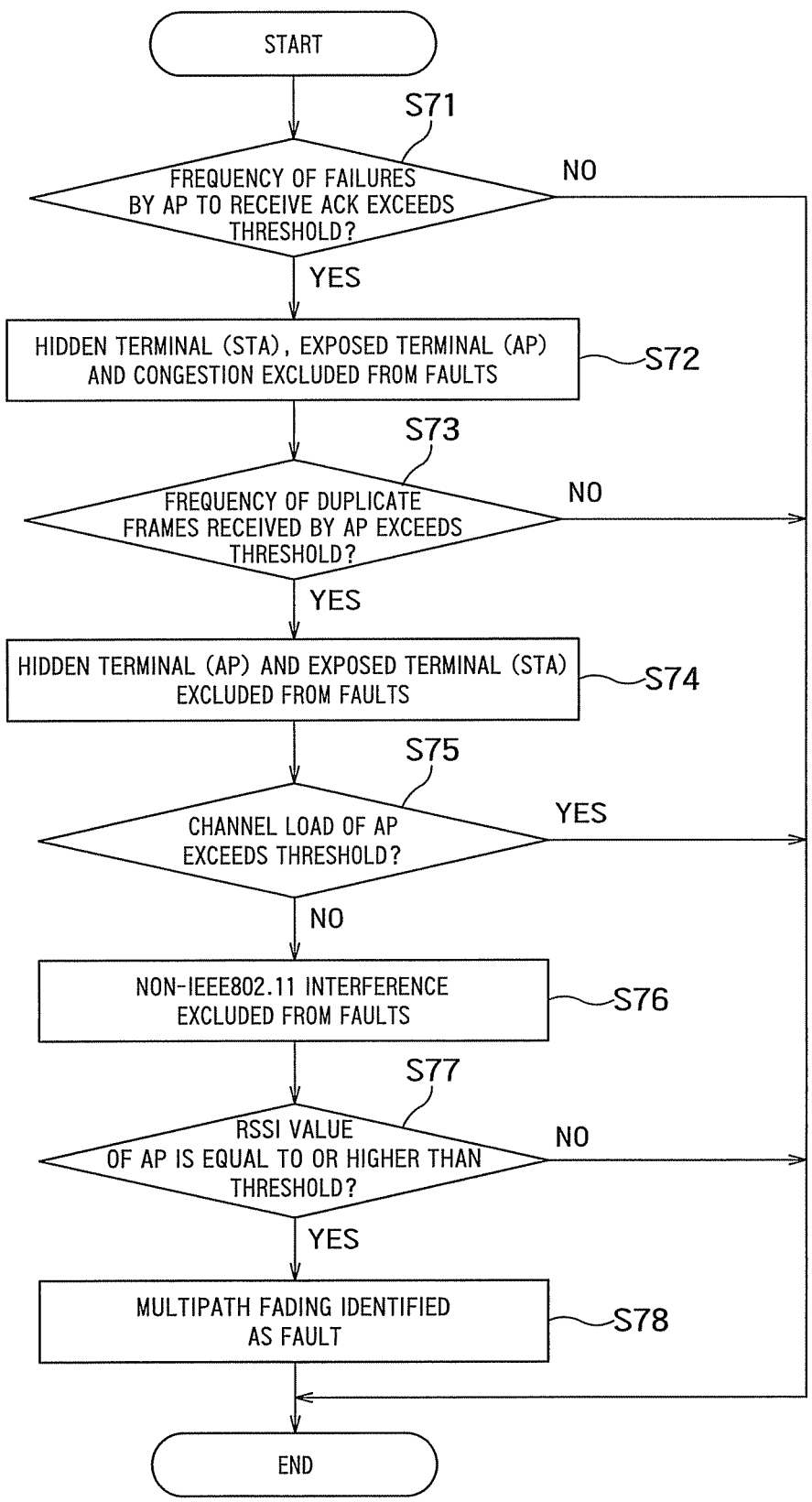
FIG. 20 is a flowchart showing a procedure for identifying multipath fading.

FIG. 20 shows a flowchart of a procedure for identifying multipath fading. First, the frequency of failures to receive ACK on an AP is judged (step S71). If the frequency of failures to receive ACK exceeds a threshold (ACK threshold), hidden terminal (STA), exposed terminal (AP) and congestion are excluded from faults (step S72). Next, the reception frequency of duplicate frames received on the AP is judged (step S73). If the reception frequency of duplicate frames exceeds a threshold (duplicate threshold), hidden terminal (AP) and exposed terminal (STA) are excluded from the faults (step S74). Next, Channel Load on the AP is judged (step S75). If Channel Load does not exceed a threshold (channel threshold), non-IEEE802.11 interference is excluded from the faults (step S76). Next, an RSSI value on the AP is judged (step S77). If the RSSI value is equal to or higher than a threshold (received intensity threshold), there is no possibility that shadowing may be the faults, and multipath fading is confirmed to be the fault and can be identified as such (step S78). The identification accuracy can be improved by adding and executing judgment of other than the statistical information shown here.

In above step S71, the frequency of failures to receive ACK on an AP is judged, and in step S73, the reception frequency of duplicate frames received on the AP is judged, but in step S71, the frequency of failures to receive ACK on an STA may be judged, and in step S73, the reception frequency of duplicate frames on the STA may be judged instead. By so doing, when the frequency of failures to receive ACK on the STA exceeds a threshold (ACK threshold), in step S72, hidden terminal (AP), exposed terminal (STA) and congestion are excluded from the faults. When the reception frequency of duplicate frames received on the STA exceeds a threshold (duplicate threshold), in step S74, hidden terminal (STA) and exposed terminal (AP) are excluded from the faults.

In step S75 above, Channel Load on the AP is judged, but Channel Load on the STA may also be judged instead. By so doing, when Channel Load on the STA does not exceed a threshold (channel threshold), non-IEEE802.11 interference is excluded from the faults.

Furthermore, in step S77 above, the RSSI value on the AP is judged, but the RSSI value on the STA may also be judged. By so doing, when the RSSI value on the STA is equal to or higher than a threshold (received intensity threshold), the possibility of shadowing is excluded and multipath fading is identified as the fault.

<Identification of Non-IEEE802.11 Interference>

Figure 21:
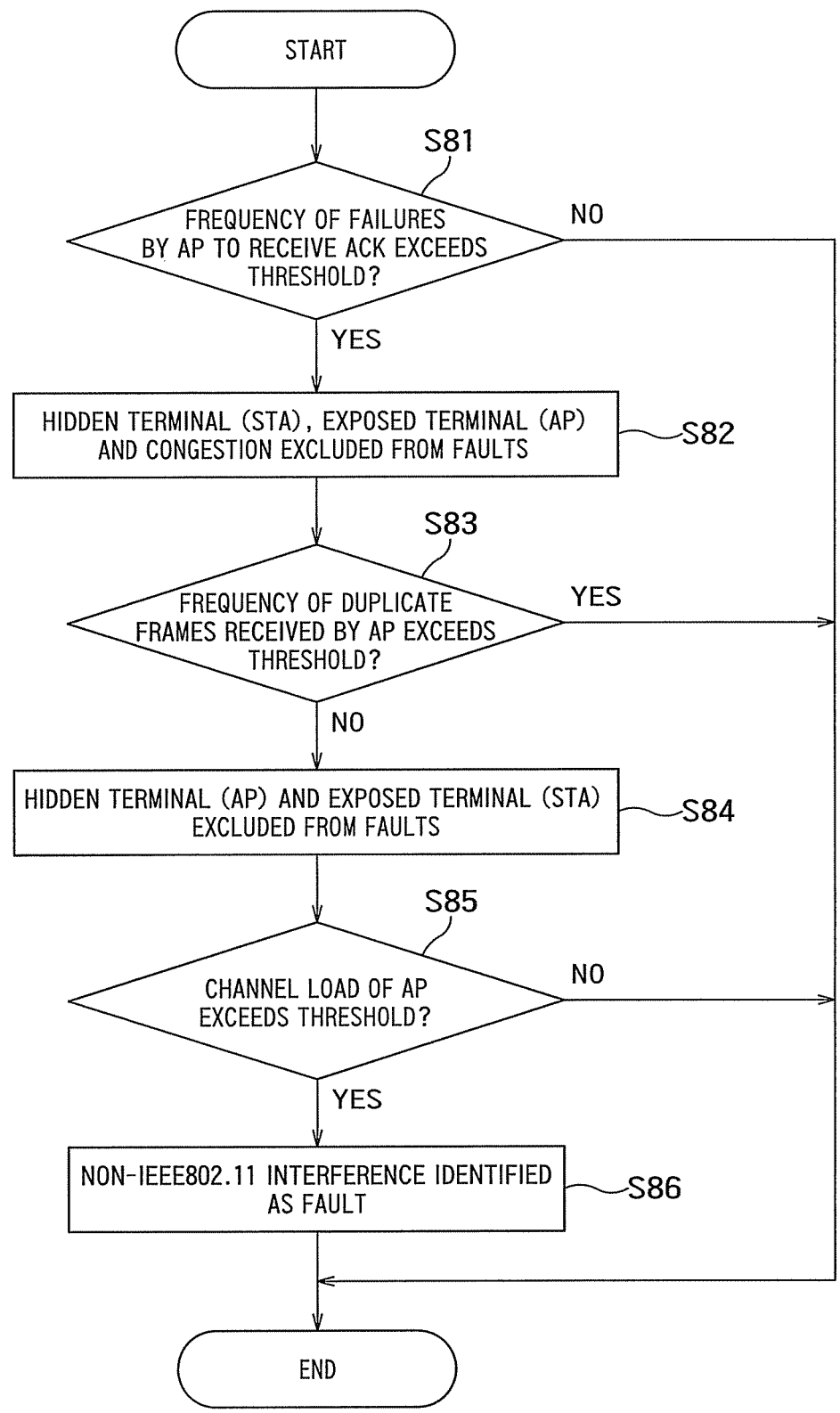
FIG. 21 is a flowchart showing a procedure for identifying non-IEEE802.11 interference.

FIG. 21 shows a flowchart showing a procedure for identifying non-IEEE802.11 interference. First, the frequency of failures to receive ACK on an AP is judged (step S81). If the frequency of failures to receive ACK exceeds a threshold (ACK threshold), hidden terminal (STA), exposed terminal (AP) and congestion are excluded from faults (step S82). Next, the reception frequency of duplicate frames received on the AP is judged (step S83). If the reception frequency of duplicate frames exceeds a threshold (duplicate), hidden terminal (AP) and exposed terminal (STA) are excluded from the faults (step S84). Next, Channel Load on the AP is judged (step S85). When Channel Load exceeds a threshold (channel threshold), there is no possibility that multipath fading and shadowing may be the faults, and non-IEEE802.11 interference is confirmed to be the fault and can be identified as such (step S86). The identification accuracy can be improved by adding and executing judgment of other than the statistical information shown here.

The frequency of failures to receive ACK on an AP is judged in step S81 above and the reception frequency of duplicate frames received on the AP is judged in step S83, but instead of this, the frequency of failures to receive ACK on an STA may be judged in step S81 and the reception frequency of duplicate frames received on the STA may be judged in step S83. By so doing, when the frequency of failures to receive ACK on the STA exceeds a threshold (ACK threshold), hidden terminal (AP), exposed terminal (STA) and congestion are excluded from faults in step S82. When the reception frequency of duplicate frames received on the STA exceeds a threshold (duplicate threshold), hidden terminal (STA) and exposed terminal (AP) are excluded from the faults in step S74.

Furthermore, in step S85 above, Channel Load on the AP is judged, but Channel Load on the STA may also be judged instead. By so doing, when Channel Load on the STA exceeds a threshold (channel threshold), the possibility of multipath fading and shadowing is excluded and non-IEEE802.11 interference is identified as the fault.

<Identification of Congestion>

Figure 22:
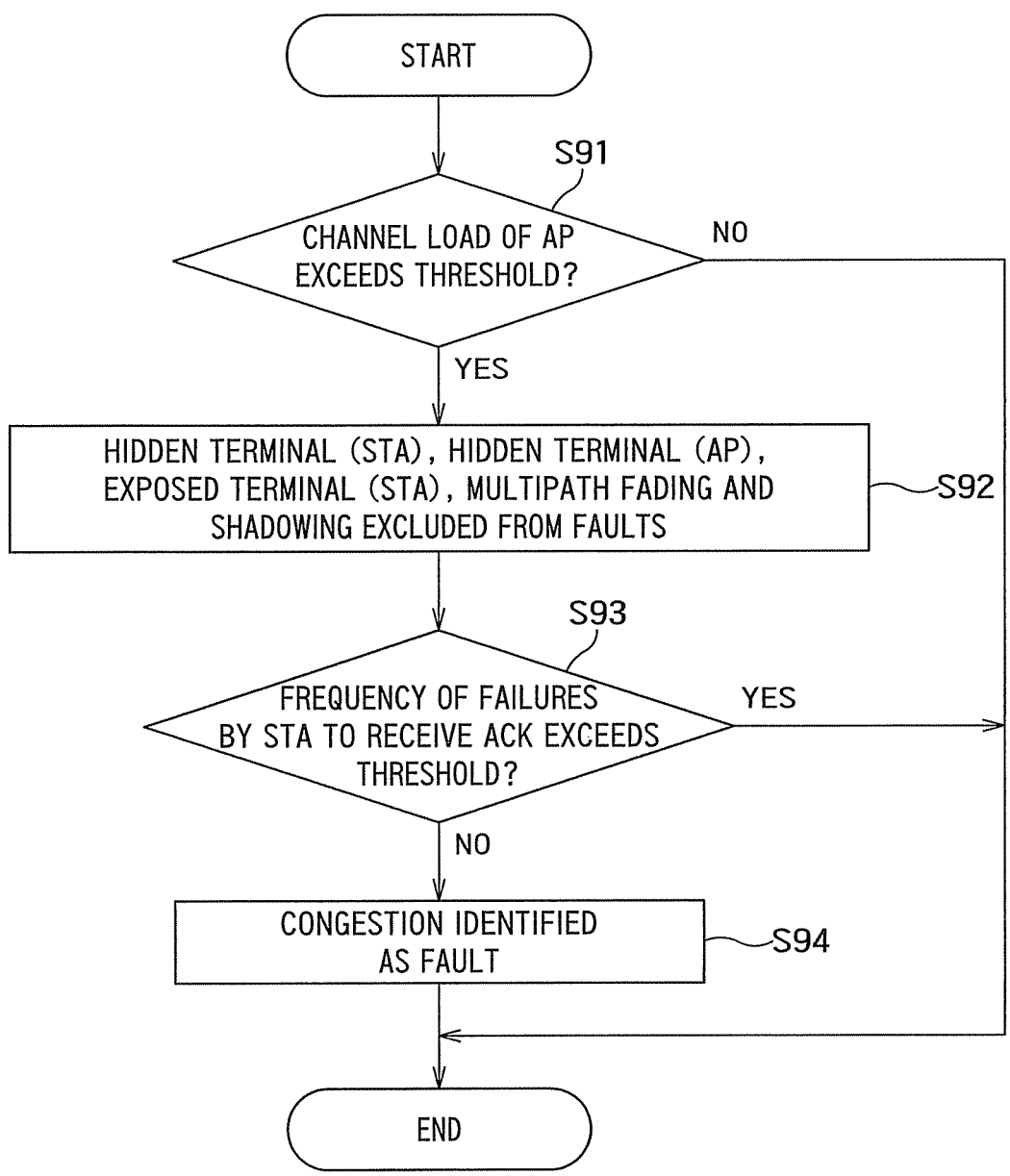
FIG. 22 is a flowchart showing a procedure for identifying congestion.

FIG. 22 shows a flowchart of a procedure for identifying congestion. First, Channel Load on an AP is judged (step S91). When Channel Load exceeds a threshold (channel threshold), hidden terminal (STA), hidden terminal (AP), exposed terminal (STA), multipath fading and shadowing are excluded from faults (step S92). Next, the frequency of failures to receive ACK on an STA is judged (step S93). If the frequency of failures to receive ACK on the STA does not exceed a threshold (ACK threshold), there is no possibility that exposed terminal (AP) and non-IEEE802.11 interference may be the faults, and congestion is confirmed to be the fault and can be identified as such (step S94). The identification accuracy can be improved by adding and executing judgment of other than the statistical information shown here.

Channel Load on the AP is judged in step S91 above and the frequency of failures to receive ACK on an STA is judged in step S93, but instead of this, Channel Load on the STA may be judged in step S91 and the frequency of failures to receive ACK on the AP may be judged in step S93. By so doing, when Channel Load on the STA exceeds a threshold (channel threshold), hidden terminal (STA), hidden terminal (AP), exposed terminal (AP), multipath fading and shadowing are excluded from the faults. When the frequency of failures to receive ACK on the AP does not exceed a threshold (ACK threshold), the possibility of exposed terminal (AP) and non-IEEE802.11 interference is excluded and congestion is identified as the fault.

<Identification of Shadowing>

Figure 23:
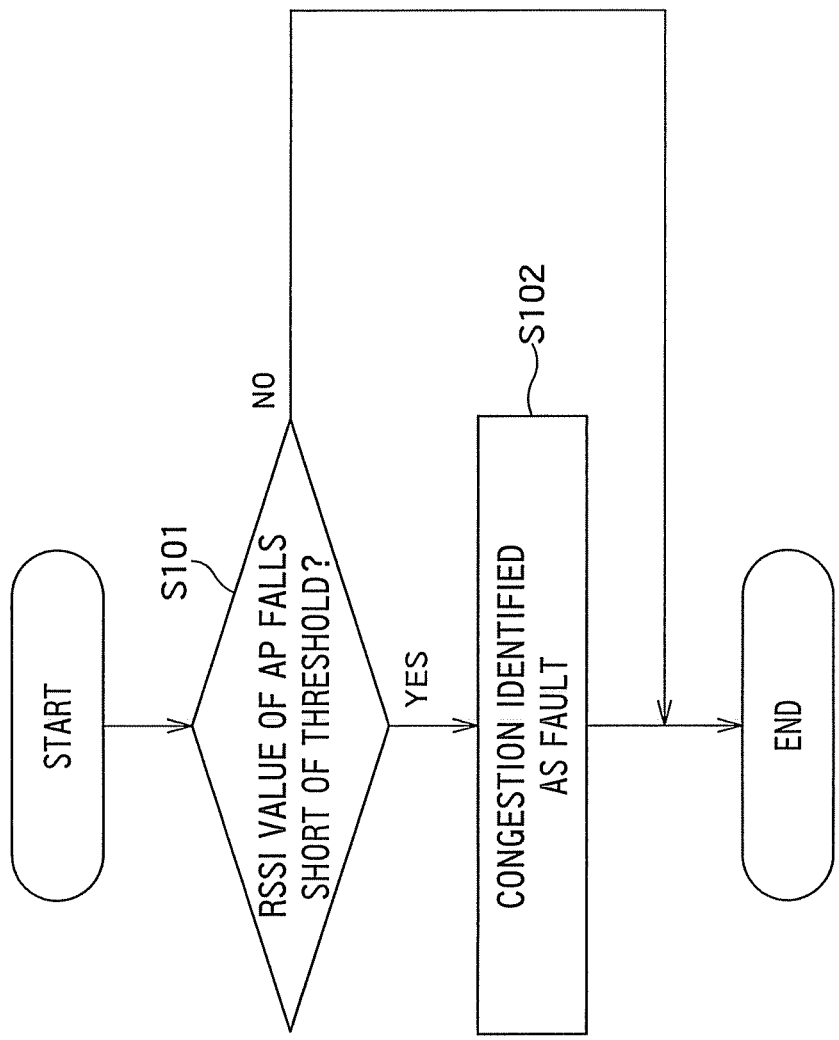
FIG. 23 is a flowchart showing a procedure for identifying shadowing.

FIG. 23 shows a flowchart of a procedure for identifying shadowing. First, an RSSI value on an AP is judged (step S101). If the RSSI value falls short of a threshold (received intensity threshold), there is no possibility of all the other faults, and shadowing is confirmed to be the fault and can be identified as such (step S102). However, since the RSSI value is a value that varies a great deal even in a normal state, the RSSI value may be wrongly detected. Therefore, the identification accuracy can be improved by adding and executing judgments of other than the RSSI value.

In step S101 above, the RSSI value on the AP is judged, but the RSSI value on the STA may be judged instead. By so doing, when the RSSI value on the STA falls short of the threshold (received intensity threshold), the possibility of all the other faults is excluded and shadowing is identified as the fault.

For the various thresholds (received intensity threshold, channel threshold, ACK threshold, duplicate threshold, RTS threshold), values that vary from one fault to another can be set. Furthermore, different values can also be set as these thresholds between the radio terminal and radio base station. Furthermore, these thresholds may be dynamically updated according to a variation in an environment of the wireless LAN system and changes of an application used by the radio terminal.

Furthermore, when a fault can be identified, the fault may also be reported immediately to the administrator by mail or the like so as to prompt the administrator to quickly take remedial actions. Furthermore, in the case of a fault such as congestion for which remedial actions can be taken dynamically under the control of the radio base station, it is also possible to ask the apparatus having the corresponding function for the remedial actions and automate a series of processes from the identification of the fault to the remedial actions.

What is claimed is:

1. A communication apparatus that identifies a fault of a radio link between a radio terminal and a radio base station, comprising:
    a statistical information acquisition unit configured to acquire statistical information indicating a state of the radio link between the radio terminal and the radio base station from at least one of the radio terminal and the radio base station; and
    a fault identification unit configured to identify a fault of the radio link based on an acquired statistical information from among a plurality of faults associated with a plurality of statistical information beforehand, wherein the statistical information includes:
        one or both of a terminal side channel load indicating a ratio of time during which the radio terminal judges that the radio link is busy in a predetermined time and a base station side channel load indicating a ratio of time during which the radio base station judges that the radio link is busy in the predetermined time,
        a frequency of failures to receive an acknowledgment (ACK) frame,
        a reception frequency of duplicate data frames which are frames identical to a previously received data frame, and
        one or both of a reception frequency of Request to Send (RTS) frames received by the radio base station from a different radio base station or a different radio terminal that belongs to the different radio base station and a reception frequency of RTS frames received by the radio terminal from the different radio base station or the different radio terminal,
    wherein the frequency of failures to receive an ACK frame includes one or both of a frequency of failures by the radio terminal to receive an ACK frame from the radio base station or a frequency of failures by the radio base station to receive an ACK frame from the radio terminal,
    wherein the reception frequency of duplicate data frames includes one or both of a reception frequency of duplicate data frames received by the radio terminal from the radio base station or a reception frequency of duplicate data frames received by the radio base station from the radio terminal, and
    wherein the fault identification unit identifies whether the radio terminal exists as a hidden terminal or an exposed terminal based on determinations of whether the frequency of failures to receive the ACK frame exceeds an ACK threshold, whether the reception frequency of duplicate frames is equal to or lower than a duplicate threshold, and whether the base station side channel load exceeds a channel threshold, the terminal side channel load exceeds a channel threshold, or the reception frequency of RTS frames exceeds an RTS threshold.

2. The apparatus according to claim 1, wherein the fault identification unit identifies, as the fault, that the radio terminal exists as the hidden terminal in response to determining that:
    the frequency of failures to receive the ACK frame exceeds the ACK threshold,
    the reception frequency of duplicate frames is equal to or lower than the duplicate threshold, and
    the base station side channel load is equal to or lower than the channel threshold or the reception frequency of RTS frames is equal to or lower than the RTS threshold.

3. A method for identifying a fault of a radio link between a radio terminal and a radio base station, comprising:
    acquiring statistical information indicating a state of the radio link between the radio terminal and the radio base station from at least one of the radio terminal and the radio base station; and
    identifying a fault of the radio link based on an acquired statistical information from among a plurality of faults associated with a plurality of statistical information beforehand, wherein the statistical information includes:
        one or both of a terminal side channel load indicating a ratio of time during which the radio terminal judges that the radio link is busy in a predetermined time and a base station side channel load indicating a ratio of time during which the radio base station judges that the radio link is busy in the predetermined time,
        a frequency of failures to receive an acknowledgment (ACK) frame,
        a reception frequency of duplicate data frames which are frames identical to a previously received data frame, and
        one or both of a reception frequency of Request to Send (RTS) frames received by the radio base station from a different radio base station or a different radio terminal that belongs to the different radio base station and a reception frequency of RTS frames received by the radio terminal from the different radio base station or the different radio terminal,
    wherein the frequency of failures to receive an ACK frame includes one or both of a frequency of failures by the radio terminal to receive an ACK frame from the radio base station and a frequency of failures by the radio base station to receive an ACK frame from the radio terminal,
    wherein the reception frequency of duplicate data frames includes one or both of a reception frequency of duplicate data frames received by the radio terminal from the radio base station and a reception frequency of duplicate data frames received by the radio base station from the radio terminal, and wherein the identifying comprises identifying whether the radio terminal exists as a hidden terminal or an exposed terminal based on determining whether the frequency of failures to receive the ACK frame exceeds an ACK threshold, whether the reception frequency of duplicate frames is equal to or lower than a duplicate threshold, and whether the base station side channel load exceeds a channel threshold, the terminal side channel load exceeds a channel threshold, or the reception frequency of RTS frames exceeds an RTS threshold.

4. A non-transitory computer program storage medium storing a computer program for causing a computer to identify a fault of a radio link between a radio terminal and a radio base station, to execute instructions to perform:
acquiring statistical information indicating a state of the radio link between the radio terminal and the radio base station from at least one of the radio terminal and the radio base station; and
identifying a fault of the radio link based on an acquired statistical information from among a plurality of faults associated with a plurality of statistical information beforehand, wherein the statistical information includes:
one or both of a terminal side channel load indicating a ratio of time during which the radio terminal judges that the radio link is busy in a predetermined time and a base station side channel load indicating a ratio of time during which the radio base station judges that the radio link is busy in the predetermined time,
a frequency of failures to receive an acknowledgment (ACK) frame,
a reception frequency of duplicate data frames which are frames identical to a previously received data frame, and
one or both of a reception frequency of Request To Send (RTS) frames received by the radio base station from a different radio base station or a different radio terminal that belongs to the different radio base station and a reception frequency of RTS frames received by the radio terminal from the different radio base station or the different radio terminal,
wherein the frequency of failures to receive an ACK frame includes one or both of a frequency of failures by the radio terminal to receive an ACK frame from the radio base station and a frequency of failures by the radio base station to receive an ACK frame from the radio terminal,
wherein the reception frequency of duplicate data frames includes one or both of a reception frequency of duplicate data frames received by the radio terminal from the radio base station and a reception frequency of duplicate data frames received by the radio base station from the radio terminal; and
wherein the identifying comprises identifying whether the radio terminal exists as a hidden terminal or an exposed terminal based determinations of whether the frequency of failures to receive the ACK frame exceeds an ACK threshold, whether the reception frequency of duplicate frames is equal to or lower than a duplicate threshold, and whether the base station side channel load exceeds a channel threshold, the terminal side channel load exceeds a channel threshold, or the reception frequency of RTS frames exceeds an RTS threshold.

5. The apparatus according to claim 1, wherein
the fault identification unit identifies, as the fault, that the radio base station exists as the hidden terminal, in response to determining that:
the frequency of failures to receive the ACK frame exceeds the ACK threshold,
the reception frequency of duplicate frames is equal to or lower than the duplicate threshold, and
the terminal side channel load is equal to or lower than the channel threshold or the reception frequency of RTS frames is equal to or lower than the RTS threshold.

6. The apparatus according to claim 1, wherein the fault identification unit identifies, as the fault, that the radio terminal exists as the exposed terminal in response to determining that:
the frequency of failures to receive the ACK frame exceeds the ACK threshold,
the reception frequency of duplicate frames is equal to or lower than the duplicate threshold, and
the terminal side channel load exceeds the channel threshold or the reception frequency of RTS frames exceeds the RTS threshold.

7. The apparatus according to claim 1, wherein the fault identification unit identifies, as the fault, that the radio base station exists as the exposed terminal in response to determining that:
the frequency of failures to receive the ACK frame exceeds the ACK threshold,
the reception frequency of duplicate frames is equal to or lower than the duplicate threshold, and
the base station side channel load exceeds the channel threshold or the reception frequency of RTS frames exceeds the RTS threshold.

8. The method according to claim 3, further comprising identifying, as the fault, that the radio terminal exists as the hidden terminal in response to determining that:
the frequency of failures to receive the ACK frame exceeds the ACK threshold,
the reception frequency of duplicate frames is equal to or lower than the duplicate threshold, and
the base station side channel load is equal to or lower than the channel threshold or the reception frequency of RTS frames is equal to or lower than the RTS threshold.

9. The method according to claim 3, further comprising identifying, as the fault, that the radio terminal exists as the hidden terminal in response to determining that:
the frequency of failures to receive the ACK frame exceeds the ACK threshold,
the reception frequency of duplicate frames is equal to or lower than the duplicate threshold, and
the terminal side channel load is equal to or lower than the channel threshold or the reception frequency of RTS frames is equal to or lower than the RTS threshold.

10. The method according to claim 3, further comprising identifying, as the fault, that the radio terminal exists as the exposed terminal in response to determining that:
the frequency of failures to receive the ACK frame exceeds the ACK threshold,
the reception frequency of duplicate frames is equal to or lower than the duplicate threshold, and
the terminal side channel load exceeds the channel threshold or the reception frequency of RTS frames exceeds the RTS threshold.

11. The method according to claim 3, further comprising identifying, as the fault, that the radio base station exists as the exposed terminal in response to determining that:
the frequency of failures to receive the ACK frame exceeds the ACK threshold, the reception frequency of duplicate frames is equal to or lower than the duplicate threshold, and the base station side channel load exceeds the channel threshold or the reception frequency of RTS frames exceeds the RTS threshold.

12. The non-transitory computer program storage medium according to claim 4, wherein the computer program is further for causing the computer to execute the instructions to perform:

identifying, as the fault, that the radio terminal exists as the hidden terminal in response to determining that:

the frequency of failures to receive the ACK frame exceeds the ACK threshold, the reception frequency of duplicate frames is equal to or lower than the duplicate threshold, and the base station side channel load is equal to or lower than the channel threshold or the reception frequency of RTS frames is equal to or lower than the RTS threshold.

13. The non-transitory computer program storage medium according to claim 4, wherein the computer program is further for causing the computer to execute the instructions to perform:

identifying, as the fault, that the radio terminal exists as the hidden terminal in response to determining that:

the frequency of failures to receive the ACK frame exceeds the ACK threshold, the reception frequency of duplicate frames is equal to or lower than the duplicate threshold, and the terminal side channel load is equal to or lower than the channel threshold or the reception frequency of RTS frames is equal to or lower than the RTS threshold.

14. The non-transitory computer program storage medium according to claim 4, wherein the computer program is further for causing the computer to execute the instructions to perform:

identifying, as the fault, that the radio terminal exists as the exposed terminal in response to determining that:

the frequency of failures to receive the ACK frame exceeds the ACK threshold, the reception frequency of duplicate frames is equal to or lower than the duplicate threshold, and the terminal side channel load exceeds the channel threshold or the reception frequency of RTS frames exceeds the RTS threshold.

15. The non-transitory computer program storage medium according to claim 4, wherein the computer program is further for causing the computer to execute the instructions to perform:

identifying, as the fault, that the radio base station exists as the exposed terminal in response to determining that:

the frequency of failures to receive the ACK frame exceeds the ACK threshold, the reception frequency of duplicate frames is equal to or lower than the duplicate threshold, and the base station side channel load exceeds the channel threshold or the reception frequency of RTS frames exceeds the RTS threshold.

\* \* \* \* \*